US012641296B2

(12) United States Patent
Jumakulyyev et al.

(10) Patent No.: US 12,641,296 B2
(45) Date of Patent: May 26, 2026

(54) ADAPTIVE LOOP FILTER CLASSIFIERS

(71) Applicant: QUALCOMM Incorporated, San Diego, CA (US)

(72) Inventors: Ikram Jumakulyyev, Gröbenzell (DE); Nan Hu, San Diego, CA (US); Vadim Seregin, San Diego, CA (US); Marta Karczewicz, San Diego, CA (US); Zhi Zhang, Munich (DE); Han Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 18/532,874

(22) Filed: Dec. 7, 2023

(65) Prior Publication Data
US 2024/0223816 A1 Jul. 4, 2024

Related U.S. Application Data

(60) Provisional application No. 63/478,349, filed on Jan. 3, 2023.

(51) Int. Cl.
*H04N 19/82* (2014.01)
*H04N 19/117* (2014.01)
*H04N 19/176* (2014.01)

(52) U.S. Cl.
CPC ........... *H04N 19/82* (2014.11); *H04N 19/117* (2014.11); *H04N 19/176* (2014.11)

(58) Field of Classification Search
CPC ..... H04N 19/117; H04N 19/176; H04N 19/82
See application file for complete search history.

(56) References Cited

U.S. PATENT DOCUMENTS 11,778,177 B2 10/2023 Karczewicz et al.
2007/0237226 A1* 10/2007 Regunathan ......... H04N 19/567
375/240.27

(Continued)

FOREIGN PATENT DOCUMENTS

WO 2019182159 A1 9/2019
WO 2020259538 A1 12/2020

(Continued)

OTHER PUBLICATIONS

Browne A., et al., "Algorithm Description for Versatile Video Coding and Test Model 19 (VTM 19)", Joint Video Experts Team (JVET) of ITU-T SG 16 WP 3 and ISO/IEC JTC 1/SC 29, Mainz, The Joint Video Exploration Team of ISO/IEC JTC1/SC29/WG11 and ITU-T SG. 16, No. JVET-AB2002-V1, m61497, 28th Meeting, by teleconference, Oct. 20-28, 2022, Dec. 19, 2022, 133 Pages, XP030306361, Paragraph [03.7],.

(Continued)

*Primary Examiner* — Md N Haque
(74) *Attorney, Agent, or Firm* — Shumaker & Sieffert, P. A.

(57) ABSTRACT
Example methods and devices are disclosed relating to the use of adaptive loop filter classifiers. An example method includes determining a sum of absolute values of one or more reconstructed residual sample values within a window associated with a block of the video data. The example method includes determining a class index based at least in part on the sum of absolute values. The example method includes determining an adaptive loop filter based on the class index. The example method includes applying the adaptive loop filter to a current to-be-filtered sample of the block. The example method includes decoding the block based on the application of the adaptive loop filter.

30 Claims, 17 Drawing Sheets

(56)         References Cited

U.S. PATENT DOCUMENTS

| | | | |
|---|---|---|---|
| 2014/0037017 A1 | 2/2014 | Lin et al. | |
| 2014/0119451 A1* | 5/2014 | Sethuraman | H04N 19/513 |
| | | | 375/240.16 |
| 2017/0237981 A1 | 8/2017 | Karczewicz et al. | |
| 2017/0237982 A1 | 8/2017 | Karczewicz et al. | |
| 2017/0238020 A1 | 8/2017 | Karczewicz et al. | |
| 2019/0132596 A1 | 5/2019 | Sharman et al. | |
| 2019/0306534 A1 | 10/2019 | Zhang et al. | |
| 2020/0029095 A1 | 1/2020 | Karczewicz et al. | |
| 2020/0244988 A1 | 7/2020 | Narroschke et al. | |
| 2020/0404339 A1 | 12/2020 | Chernyak et al. | |
| 2021/0021820 A1 | 1/2021 | Ikai et al. | |
| 2021/0084340 A1 | 3/2021 | Li et al. | |
| 2021/0152841 A1 | 5/2021 | Hu et al. | |
| 2021/0160513 A1* | 5/2021 | Hu | H04N 19/82 |
| 2022/0007057 A1* | 1/2022 | Liu | H04N 19/119 |
| 2022/0030232 A1 | 1/2022 | Hu | |
| 2022/0182680 A1 | 6/2022 | Du et al. | |
| 2022/0191551 A1 | 6/2022 | Zhao et al. | |
| 2023/0010869 A1 | 1/2023 | Hu et al. | |

FOREIGN PATENT DOCUMENTS

| | | | |
|---|---|---|---|
| WO | 2021061814 A1 | 4/2021 | |
| WO | 2021083259 A1 | 5/2021 | |

OTHER PUBLICATIONS

International Search Report and Written Opinion—PCT/US2023/083116—ISA/EPO—Mar. 1, 2024 15 Pages.

Taiwan Search Report—TW110148425—TIPO—Aug. 25, 2025.

Bross B., et al., "Versatile Video Coding (Draft 10)", Joint Video Experts Team (JVET) of ITU-T SG 16 WP 3 and ISO/IEC JTC 1/SC 29/WG 11, 131, MPEG Meeting, 19th Meeting, by Teleconference, Jun. 22-Jul. 1, 2020, Jun. 29, 2020-Jul. 3, 2020, Online, (Motion Picture Expert Group or ISO/IEC JTC1/SC29/WG11), No. JVET-S2001-vH, Version 17, Sep. 4, 2020, XP030293002, 548 Pages.

Chang Y-J., et al., "Compression Efficiency Methods Beyond VVC", JVET-U0100, Joint Video Experts Team (JVET) of ITU-T SG 16 WP 3 and ISO/IEC JTC 1/SC 29, 21st Meeting, by Teleconference, Jan. 6-15, 2021, XP030293237, Dec. 31, 2020, pp. 1-13, sections 3.2 and 3.3, abstract, Section 5.

Chen J., et al., "Algorithm Description for Versatile Video Coding and Test Model 11 (VTM 11)", 20th JVET Meeting, Oct. 7, 2020-Oct. 16, 2020, Teleconference, (The Joint Video Exploration Team of ISO/IEC JTC1/SC29/WG11 and ITU-T SG.16), No. JVET-T2002-v1, 132. MPEG Meeting, Oct. 12, 2020-Oct. 16, 2020, Online, (Motion Picture Expert Group or ISO/IEC JTC1/SC29/WG11), No. m55626, Dec. 14, 2020 (Dec. 14, 2020), XP030293335, pp. 1-102.

Chen J., et al., "Algorithm Description for Versatile Video Coding and Test Model 2 (VTM 2)", 11. JVET Meeting, Jul. 10, 2018-Jul. 18, 2018, Ljubljana, (The Joint Video Exploration Team of ISO/IEC JTC1/SC29/WG11 and ITU-TSG. 16 WP 3), No. JVET-K1002-v1, Aug. 10, 2018 (Aug. 10, 2018), XP030193537, 19 Pages, Sections 1-3, figure 1.

Chen J., et al., "Algorithm Description for Versatile Video Coding and Test Model 2 (VTM 2)", Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.

Chen J., et al., "Algorithm Description of Joint Exploration Test Model 7 (JEM7)", 119 . MPEG Meeting, 7. JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. m41357, No. G1001_v1, JVET-G1001, 7th Meeting, Jul. 13, 2017-Jul. 21, 2017, Torino, IT, N17055, Aug. 19, 2017, XP030150980, XP030023716, 50 Pages.

Coban M., et al., "Algorithm Description of Enhanced Compression Model 7 (ECM 7)", JVET-AB2025, Joint Video Experts Team (JVET) of ITU-T SG 16 WP 3 and ISO/IEC JTC 1/SC 29, 28th Meeting, Mainz, DE, Oct. 20-28, 2022, pp. 1-63.

Coban M., et al., "Algorithm Description of Enhanced Compression Model 8 (ECM 8)", JVET-AC2025, Joint Video Experts Team (JVET) of ITU-T SG 16 WP 3 and ISO/IEC JTC 1/SC 29, 29th Meeting, by teleconference, Jan. 11-20, 2023, pp. 1-74.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Jumakulyyev I., et al., "EE2-4.2/4.3/4.4a: Residual based classifier and modified filter shape for ALF", Qualcomm Incorporated, JVET-AD0219-v1, Joint Video Experts Team (JVET) of ITU-T SG 16 WP 3 and ISO/IEC JTC 1/SC 29, 30th Meeting, Antalya, TR, Apr. 21-28, 2023, pp. 1-5.

Jumakulyyev I., et al., "Non-EE2: ALF Classification Based on Residual Data", Qualcomm Inc, JVET-AC0173-v3, Joint Video Experts Team (JVET) of ITU-T SG 16 WP 3 and ISO/IEC JTC 1/SC 29, 29th Meeting, by Teleconference, Jan. 11-20, 2023, pp. 1-5.

Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Wiegand T., et al., "WD3: Working Draft 3 of High-Efficiency Video Coding", JCTVC-E603_d5, Joint Collaborative Team on Video Coding (JCT-VC) of ITU-T SG16 WP3 and ISO/IEC JTC1/SC29/WG11, 5th Meeting: Geneva, CH, Mar. 16-23, 2011, 212 Pages.

* cited by examiner

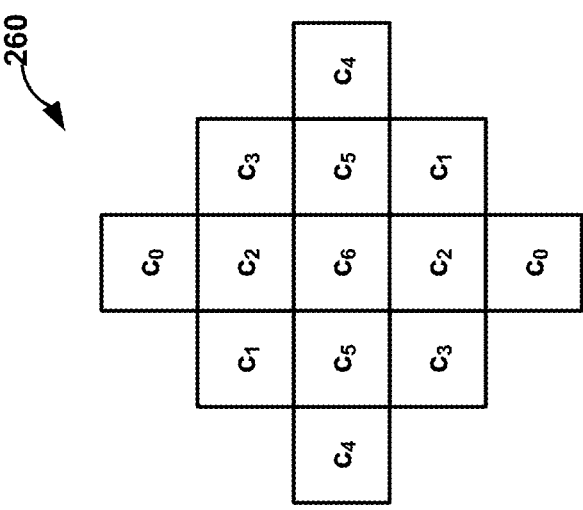
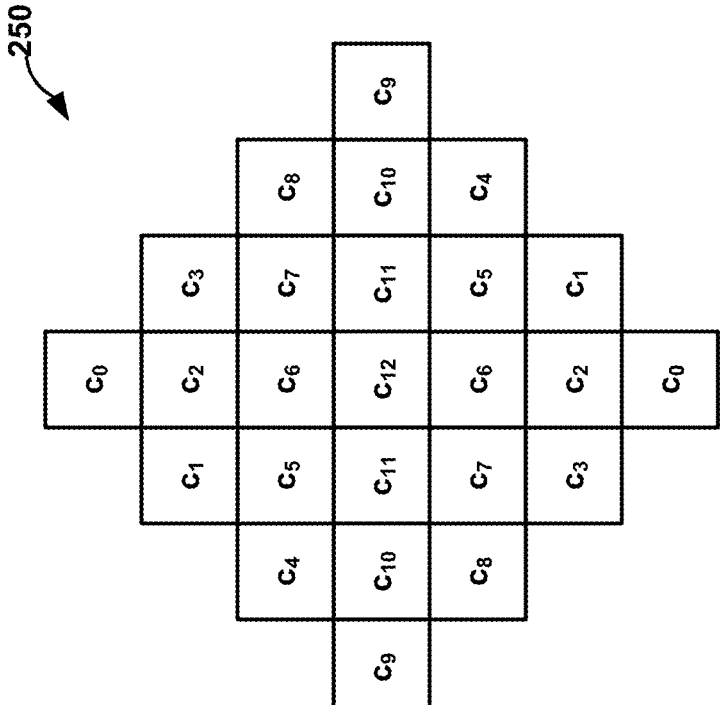
FIG. 2

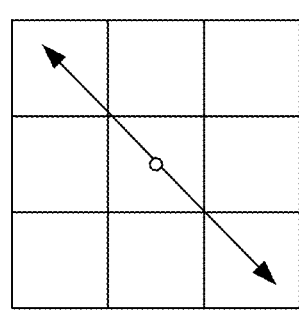
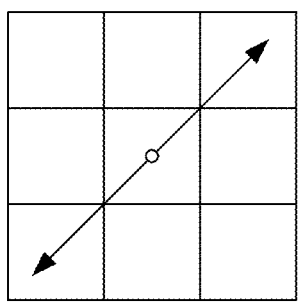
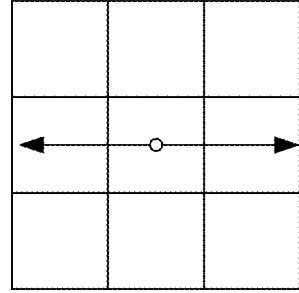
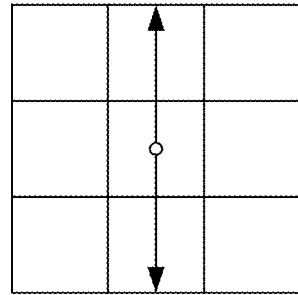
FIG. 4

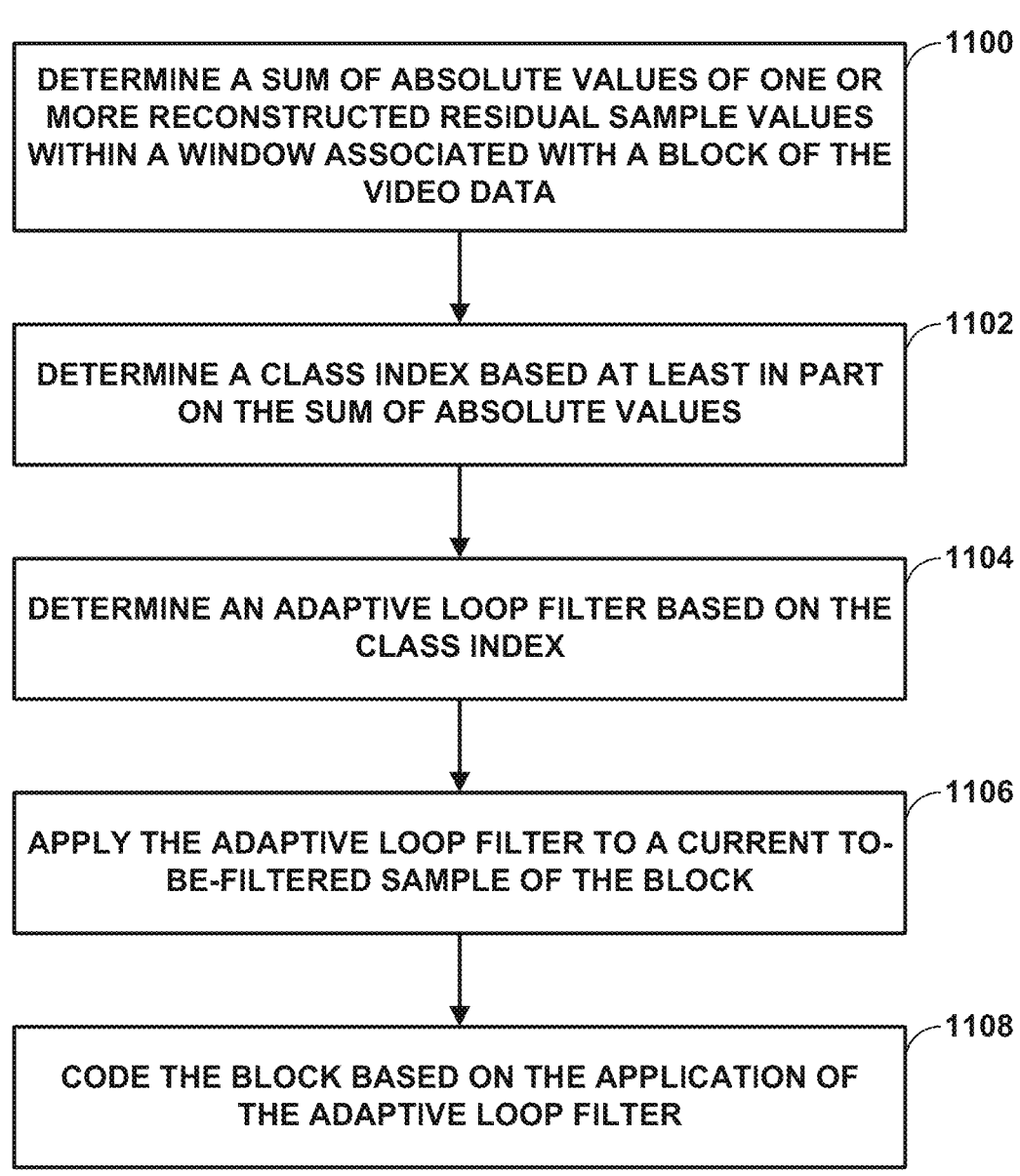

1100

DETERMINE A SUM OF ABSOLUTE VALUES OF ONE OR MORE RECONSTRUCTED RESIDUAL SAMPLE VALUES WITHIN A WINDOW ASSOCIATED WITH A BLOCK OF THE VIDEO DATA

1102

DETERMINE A CLASS INDEX BASED AT LEAST IN PART ON THE SUM OF ABSOLUTE VALUES

1104

DETERMINE AN ADAPTIVE LOOP FILTER BASED ON THE CLASS INDEX

1106

APPLY THE ADAPTIVE LOOP FILTER TO A CURRENT TO-BE-FILTERED SAMPLE OF THE BLOCK

1108

CODE THE BLOCK BASED ON THE APPLICATION OF THE ADAPTIVE LOOP FILTER

FIG. 11

PREDICT CURRENT BLOCK ⟋350

CALCULATE RESIDUAL BLOCK FOR CURRENT BLOCK ⟋352

TRANSFORM AND QUANTIZE RESIDUAL BLOCK ⟋354

SCAN TRANSFORM COEFFICIENTS OF RESIDUAL BLOCK ⟋356

ENTROPY ENCODE TRANSFORM COEFFICIENTS ⟋358

OUTPUT ENTROPY ENCODED DATA OF BLOCK ⟋360

ADAPTIVE LOOP FILTER CLASSIFIERS

This application claims the benefit of U.S. Provisional Patent Application 63/478,349, filed Jan. 3, 2023, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for using classifiers for adaptive loop filtering (ALF). Some video coders may use classifiers for ALF, such as determining which ALF filter to apply. Such classifiers may be referred to herein as ALF classifiers. These classifiers may be limited to Laplacian-based and band-based classifiers and the application of the classifiers may be limited in application to samples in the reconstruction domain. According to the techniques of this disclosure, one or more other ALF classifiers may be utilized. The one or more ALF classifiers may include Laplacian-based and band-based classifiers and/or other classifiers. Additionally, or alternatively, such classifiers may be applied to sample values in the reconstruction domain and/or other domains. For example, an ALF filter may be selected based on sample values in the reconstruction domain and/or other domains. The use of the classifier techniques of this disclosure may result in the selection of more appropriate ALF filter(s), thereby improving coding efficiency and/or improving video quality.

In one example, a method includes determining a sum of absolute values of one or more reconstructed residual sample values within a window associated with a block of the video data; determining a class index based at least in part on the sum of absolute values; determining an adaptive loop filter based on the class index; applying the adaptive loop filter to a current to-be-filtered sample of the block; and decoding the block based on the application of the adaptive loop filter.

In another example, a device includes one or more memories configured to store the video data; and one or more processors implemented in circuitry and communicatively coupled to the one or more memories, the one or more processors being configured to: determine a sum of absolute values of the one or more reconstructed residual sample values within the window associated with a block of the video data; determine a class index based at least in part on the sum of absolute values; determine an adaptive loop filter based on the class index; apply the adaptive loop filter to a current to-be-filtered sample of the block; and decode the block based on the application of the adaptive loop filter.

In another example, a method includes determining a sum of absolute values of one or more reconstructed residual sample values within a window associated with a block of the video data; determining a class index based at least in part on the sum of absolute values; determining an adaptive loop filter based on the class index; applying the adaptive loop filter to a current to-be-filtered sample of the block; and encoding the block based on the application of the adaptive loop filter.

In another example, a device includes one or more memories configured to store the video data; and one or more processors implemented in circuitry and communicatively coupled to the one or more memories, the one or more processors being configured to: determine a sum of absolute values of the one or more reconstructed residual sample values within the window associated with a block of the video data; determine a class index based at least in part on the sum of absolute values; determine an adaptive loop filter based on the class index; apply the adaptive loop filter to a current to-be-filtered sample of the block; and encode the block based on the application of the adaptive loop filter.

The details of one or more examples are set forth in the accompanying drawings and the description below. Other features, objects, and advantages will be apparent from the description, drawings, and claims.

BRIEF DESCRIPTION OF DRAWINGS

FIG. 2 is a conceptual diagram illustrating example ALF filter shapes in VVC version 1.

FIG. 4 is a conceptual diagram illustrating example Laplacian gradient values H, V, D1, D2 for a luma sample.

FIG. 11 is a flow diagram illustrating example adaptive loop filter classifier techniques in accordance with one or more aspects of this disclosure.

DETAILED DESCRIPTION

Some video coders use classifiers for ALF, for example, for selecting an ALF filter to apply. These classifiers may be limited to a Laplacian-based classifier and a band-based classifier. These classifiers may also be limited in application to samples in the reconstruction domain. According to the techniques of this disclosure, one or more other types of ALF classifiers may be utilized. Additionally, or alternatively, one or more ALF classifiers may be applied to sample values in the reconstruction domain and/or other domains. The use of the classifier techniques of this disclosure may result in a selection of more appropriate ALF filter(s), thereby improving coding efficiency and/or improving video quality.

Figure 1:
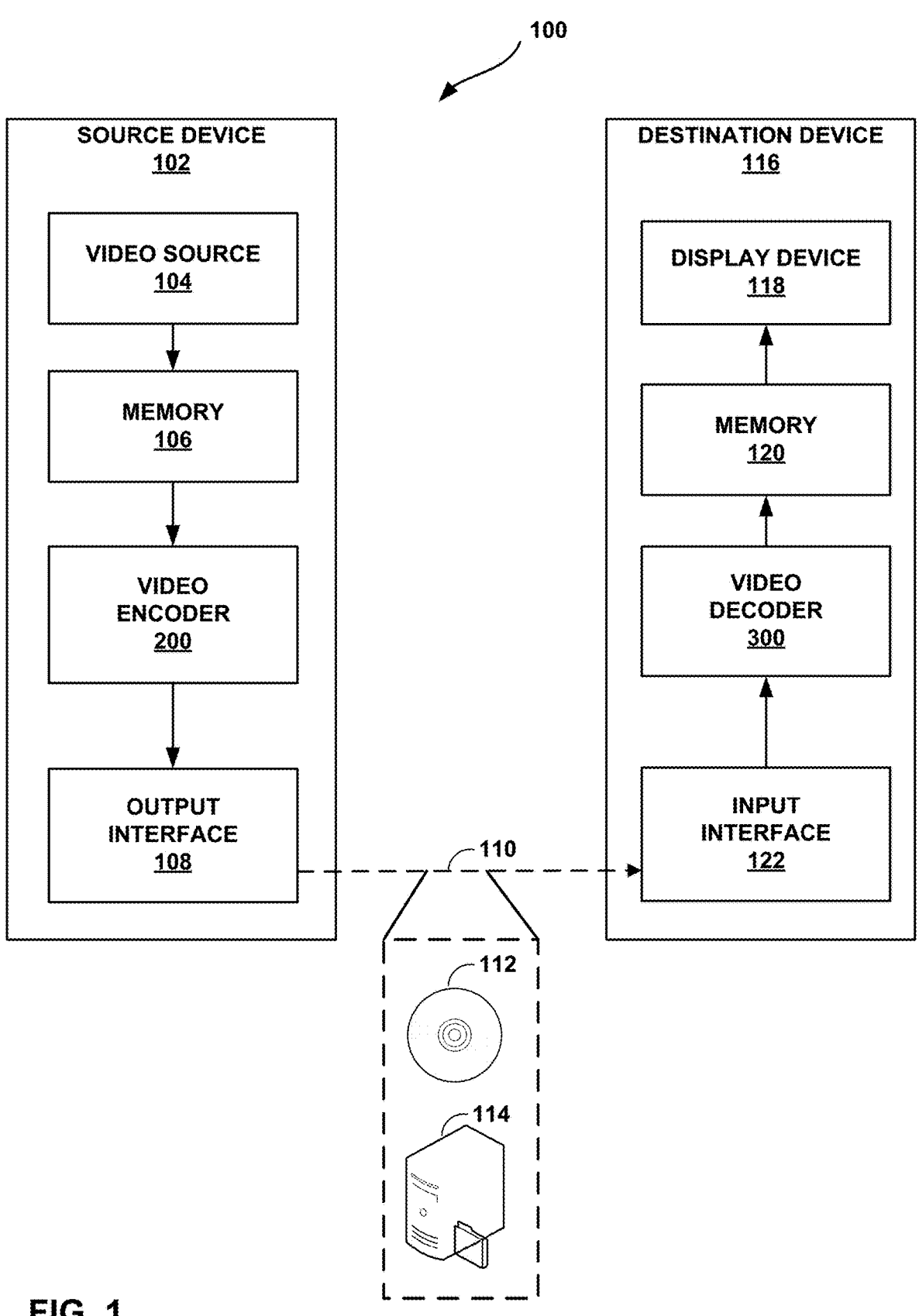
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for adaptive loop filter classifiers based on residual data. An adaptive loop filter classifier is a classifier that a video decoder 300, for example, may use to determine which adaptive loop filter, from a plurality of adaptive loop filters, to apply to decoded samples of video data. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for adaptive loop filter classifiers based on residual data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally, or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use classifiers with adaptive loop filtering.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUS) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUS having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block (which is a reconstructed residual block). Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, a method includes determining a sum of absolute values of one or more reconstructed residual sample values within a window associated with a block of the video data; determining a class index based at least in part on the sum of absolute values; determining an adaptive loop filter based on the class index; applying the adaptive loop filter to a current to-be-filtered sample of the block; and decoding the block based on the application of the adaptive loop filter.

In accordance with the techniques of this disclosure, a device includes one or more memories configured to store the video data; and one or more processors implemented in circuitry and communicatively coupled to the one or more memories, the one or more processors being configured to: determine a sum of absolute values of the one or more reconstructed residual sample values within the window associated with a block of the video data; determine a class index based at least in part on the sum of absolute values; determine an adaptive loop filter based on the class index; apply the adaptive loop filter to a current to-be-filtered sample of the block; and decode the block based on the application of the adaptive loop filter.

In accordance with the techniques of this disclosure, a method includes determining a sum of absolute values of one or more reconstructed residual sample values within a window associated with a block of the video data; determining a class index based at least in part on the sum of absolute values; determining an adaptive loop filter based on the class index; applying the adaptive loop filter to a current to-be-filtered sample of the block; and encoding the block based on the application of the adaptive loop filter.

In accordance with the techniques of this disclosure, a device includes one or more memories configured to store the video data; and one or more processors implemented in circuitry and communicatively coupled to the one or more memories, the one or more processors being configured to: determine a sum of absolute values of the one or more reconstructed residual sample values within the window associated with a block of the video data; determine a class index based at least in part on the sum of absolute values; determine an adaptive loop filter based on the class index; apply the adaptive loop filter to a current to-be-filtered sample of the block; and encode the block based on the application of the adaptive loop filter.

In video coding, such as H.266/VVC, an ALF filter may be applied to minimize the mean square error between filtered samples and original samples. The input samples of an ALF filter may be the output samples of sample adaptive offset (SAO) filtering. The output samples of the ALF filter may be stored in a decoded picture buffer (DPB) or sent out as output pictures. The filter shapes of ALF filters adopted in the joint exploration model (JEM) software were 5×5, 7×7 and 9×9 diamond shapes. In JEM, the filter shape may be selected (e.g., by video encoder 200) and signaled at a picture level.

FIG. 2 is a conceptual diagram illustrating example ALF filter shapes in VVC version 1. To obtain a better trade-off between coding efficiency and filter complexity, in VVC, only 7×7 diamond shape 250 and 5×5 diamond shape 260 may be supported for luma and chroma components, respectively, as shown in FIG. 2.

In each ALF filter, an integer coefficient $c_i$ may be represented with 7-bit fractional precision. The absolute value of $c_i$ may be coded by using a $0^{th}$-order Exp-Golomb code followed by a sign bit for a non-zero coefficient. In FIG. 2, each square corresponds to a luma or chroma sample and the center square of 7×7 diamond shape 250 ($c_{12}$) and the center square of 5×5 diamond shape 260 ($c_6$) corresponds to a current to-be-filtered sample. To reduce the overhead of sending coefficients and the number of multiplications, the ALF filter shapes in FIG. 2 are point-symmetrical. In addition, as shown in equation (1), below, the sum of all filter coefficients is equal to 128, which is the fixed-point representation of 1.0 with 7-bit fractional precision.

$$2\sum_{i=0}^{N-2} c_i + c_{N-1} = 128 \qquad (1)$$

In equation (1), N is the number of coefficients and N is equal to 13 and 7 for 7×7 and 5×5 filter shapes, respectively.

In VVC, nonlinearity is introduced to ALF. A simple clipping function may be applied to reduce the impact of a neighboring sample value when the difference between the neighboring sample value and current to-be-filtered sample value is too large. To filter a sample, ALF filtering process may be performed as $$\tilde{R}(x, y) = R(x, y) + \left[ \sum_{i=0}^{N-2} c_i(f_{i,0} + f_{i,1}) + 64 \right] \gg 7 \qquad (2)$$

where R(x,y) is a sample value after SAO.

The non-linear function may be defined with clipping functions as $$f_{i,j} = \min(b_i, \max(-b_i, R(x + x_{i,j}, y + y_{i,j}) - R(x, y))) \qquad (3)$$

where j is equal to 0 or 1, $b_i$ is a clipping parameter, and ($x_{i,j}$, $y_{i,j}$) are filter tap position offsets of ith coefficient $c_i$.

In VVC version 1, as in equation (4) below, the clipping parameter $b_i$ for a coefficient $c_i$ is determined by a clipping index $d_i$. In equation (4), BD is the internal bit depth.

$$b_i = \begin{cases} 2^{BD}, & \text{when } d_i = 0 \\ 2^{BD-1-2d_i}, & \text{otherwise} \end{cases} \qquad (4)$$

In an ALF filter, both the number of signaled coefficients and the number of signaled clipping indexes may be N−1. Each coefficient may be limited in the range of [−128, 127], which is equivalent to [−1.0, 1.0] with 7-bit fractional precision. Each clipping index $d_i$ can be 0, 1, 2 or 3 and may be signaled by using a two-bit fixed length code. To simplify the clipping operation, as in equation (4), in some examples, the value of a clipping parameter b; may only be a power of 2. Therefore, simple bit-wise logical operations can be applied as clipping operations.

Sub-block level filter adaptation is now discussed. In VVC version 1, ALF follows the same luma classification framework as ALF in JEM-7.0. To obtain a better trade-off between coding efficiency and calculation complexity, the block size for classification is increased to 4×4 samples from 2×2 samples.

Figure 3:
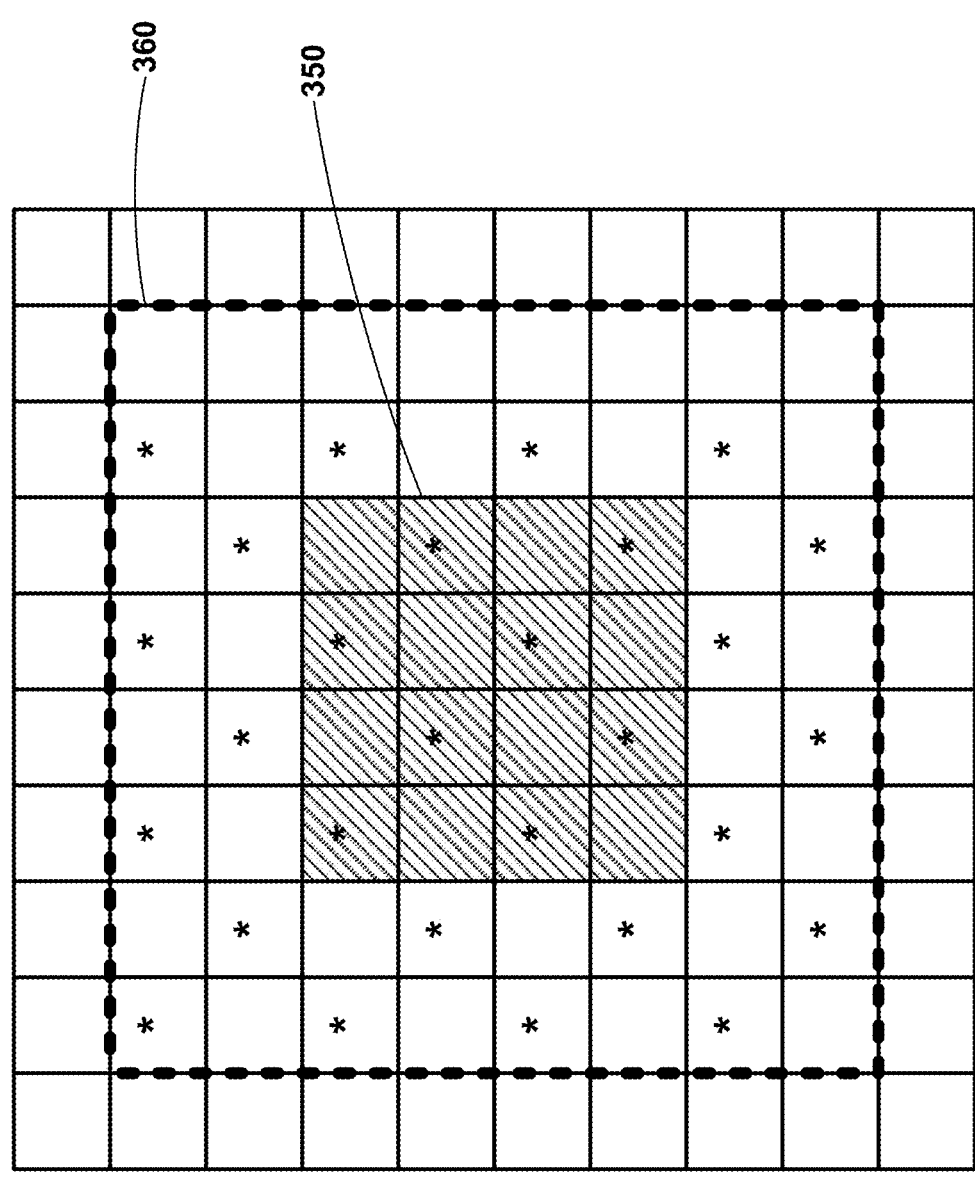
FIG. 3 is a conceptual diagram illustrating example sub-sampled Laplacian values for a 4×4 sub-block for ALF classification.

FIG. 3 is a conceptual diagram illustrating example sub-sampled Laplacian values for a 4×4 sub-block for ALF classification. To obtain the class index of a 4×4 block 350 (shown with hashed markings), a surrounding window 360 (shown with a dashed line) with 8×8 luma samples may be employed to derive direction and activity information. A surrounding window may be an area within a frame surrounding the block. In this 8×8 luma samples window 360, four gradient values of every second sample may be calculated at first, as shown in FIG. 3. For example, in FIG. 3, gradient values of samples marked with * may be calculated. Gradient values of other samples (e.g., samples not marked with *) may be set to 0.

FIG. 4 is a conceptual diagram illustrating example Laplacian gradient values H, V, D1, D2 for a luma sample. For each sample with coordinates (k,l), FIG. 4 illustrates the four gradient values: horizontal gradient H 400, vertical gradient l' 410, 135-degree gradient D1 420, and 45-degree gradient D2 430. These gradient values may be derived as follows:

$$H_{k,l} = |2R(k, l) - R(k - 1, l) - R(k + 1, l)| \qquad (5)$$

$$V_{k,l} = |2R(k, l) - R(k, l - 1) - R(k, l + 1)|$$

$$D1_{k,l} = |2R(k, l) - R(k - 1, l - 1) - R(k + 1, l + 1)|$$

$$D2_{k,l} = |2R(k, l) - R(k - 1, l + 1) - R(k + 1, l - 1)|$$

In the following equations, i and j refer to the coordinates of the upper left sample in the 4×4 block. The summation of calculated horizontal gradient $g_H$, vertical gradient $g_V$, 135-degree gradient $g_{D1}$ and 45-degree gradient 902 may be calculated as follows:

$$g_H = \sum_{k=i-2}^{i+5} \sum_{l=j-2}^{j+5} H_{k,l}, \; g_v = \sum_{k=i-2}^{i+5} \sum_{l=j-2}^{j+5} V_{k,l} \qquad (6)$$

$$g_{D1} = \sum_{k=i-2}^{i+5} \sum_{l=j-2}^{j+5} D1_{k,l}, \; g_{D2} = \sum_{k=i-2}^{i+5} \sum_{l=j-2}^{j+5} D2_{k,l}$$

The ratio of a maximum and minimum of the horizontal and vertical gradients, denoted by $R_{H,V}$ and the ratio of a maximum and minimum of the two diagonal gradients, denoted by $R_{D1,D2}$ may be calculated in equation (7).

$$R_{H,V} = \max(g_H, g_V)/\min(g_H, g_V) \qquad (7)$$

$$R_{D1,D2} = \max(g_{D1}, g_{D2})/\min(g_{D1}, g_{D2})$$

$R_{H,V}$ and $R_{D1,D2}$ may be compared against each other with two thresholds $t_1=2$ and $t_2=4.5$ to derive the directionality D. For example, video encoder 200 or video decoder 300 may derive directionality D as follows:

Step 1: If both $R_{H,V} \leq t_1$ and $R_{D1,D2} \leq t_1$, D is set to 0 (texture), otherwise continue with Step 2.

Step 2: If $R_{D1,D2} > R_{H,V}$, continue with Step 3, otherwise continue with Step 4.

Step 3: If $R_{D1,D2} \leq t_2$, D is set to 1 (weak diagonal), otherwise, D is set to 2 (strong diagonal).

Step 4: If $R_{H,V} \leq t_2$, D is set to 3 (weak horizontal/vertical), otherwise, D is set to 4 (strong horizontal/vertical).

An activity value A, which may be indicative of a variance in sample values in a neighborhood of samples around the sample being filtered, may be calculated as $$A = \left( \sum_{k=i-2}^{i+5} \sum_{l=j-2}^{j+5} (V_{k,l} + H_{k,l}) \right) >> (BD-2) \qquad (8)$$

A may be further mapped to the range of 0 to 4, inclusive, and the quantized value of A mapped to the range of 0 to 4, inclusive, may be denoted as $\hat{A}$. Therefore, each 4×4 block is categorized into one of 25 classes as $$C = 5D + \hat{A} \qquad (9)$$

Therefore, a luma filter set may contain 25 filters. However, to reduce the number of bits required to represent the filter coefficients while maintaining the coding efficiency, different classes can be merged. The merged classes may use the same filters. A merging table may be signaled. For example, video encoder 200 may signal the merging table.

Figure 5:
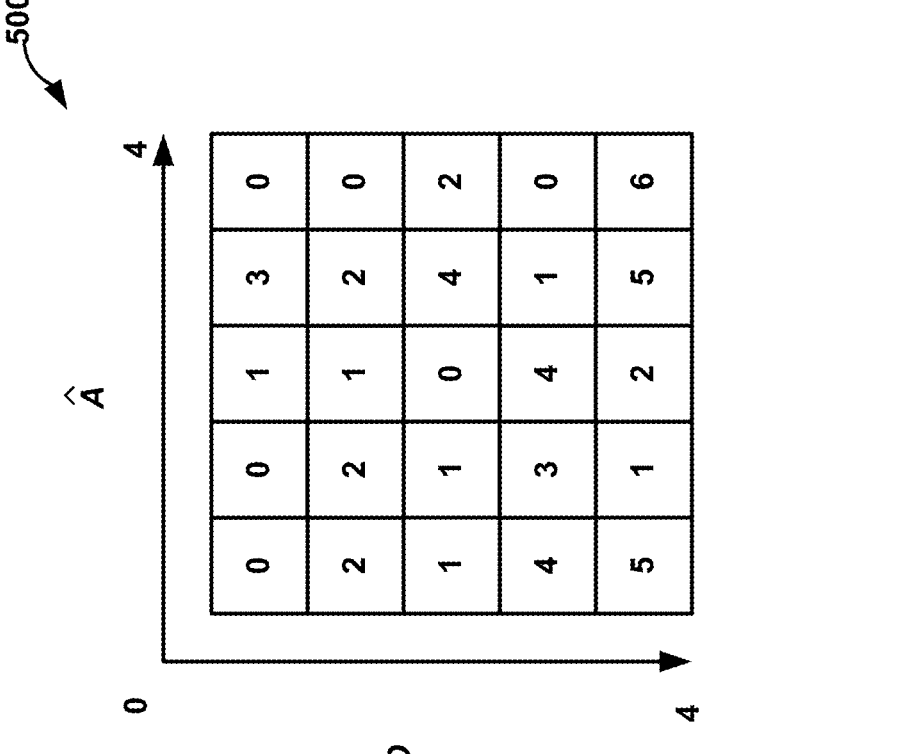
FIG. 5 is a conceptual diagram illustrating an example of merging 25 luma classes into 7 merged classes.

FIG. 5 is a conceptual diagram illustrating an example of merging 25 luma classes into 7 merged classes. In a merging table 500, a filter index of each class (e.g., a class index) may be signaled by using a fixed-length code, e.g., as illustrated in FIG. 5. For example, merging table 500 shows an example of merging 25 luma classes into 7 merged classes, where each square represents a class (index can be from 0 to 24 inclusive) based on the value of D and $\hat{A}$. In this example filter set, 7 luma filters may be signaled. For each class, the filter index (from 0 to 6 in this example) may be signaled in an ALF adaptation parameter set (ALF_APS).

Figure 6:
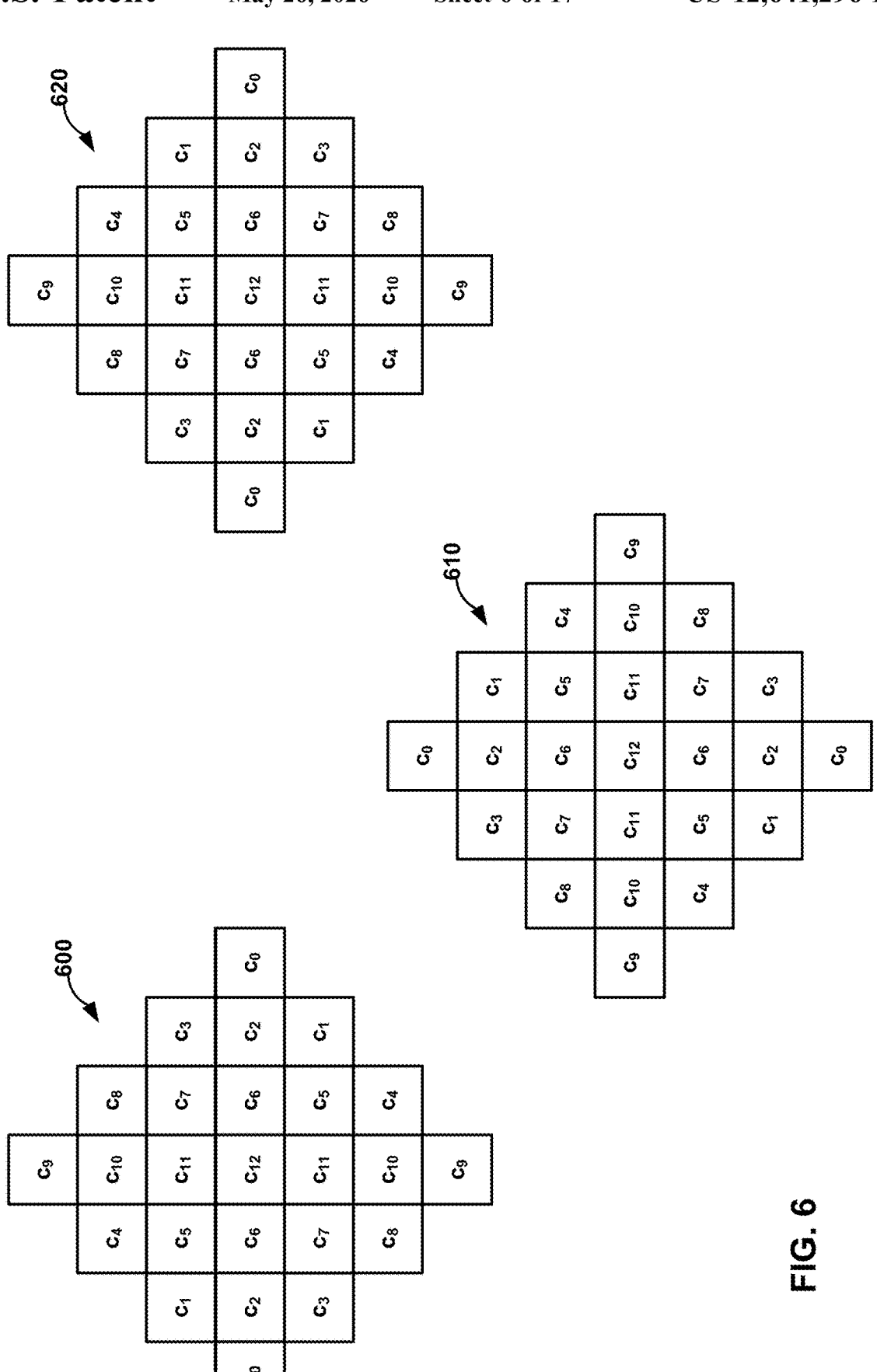
FIG. 6 is a conceptual diagram illustrating examples of geometric transformation of a 7×7 diamond filter shape.

FIG. 6 is a conceptual diagram illustrating examples of geometric transformation of a 7×7 diamond filter shape. A geometric transformation, such as that shown in FIG. 6, may also be referred to herein as a geometric transpose. Once obtaining a filter from a luma filter set based on class index C of a 4×4 block and the merging table, before filtering samples of that block, a simple geometric transformation as illustrated in FIG. 6 may be applied to the filter depending on gradient values calculated for the 4×4 block as shown in Table I below. For example, video encoder 200 or video decoder 300 may apply a geometric transformation to the filter. Geometric transform 600 represents a diagonal flip geometric transform. Geometric transform 610 represents a vertical flip geometric transform. Geometric transform 620 represents a right rotation geometric transform.

TABLE I

| Geometric transformation based on gradient values | |
| --- | --- |
| Gradient values | Transformation |
| $g_{D2} < g_{D1}$ and $g_H < g_V$ | No transformation |
| $g_{D2} < g_{D1}$ and $g_V \leq g_H$ | Diagonal flip |
| $g_{D1} \leq g_{D2}$ and $g_H < g_V$ | Vertical flip |
| $g_{D1} \leq g_{D2}$ and $g_V \leq g_H$ | Right rotation |

Coding tree block level adaptation is now discussed. In JEM-7.0, only one luma ALF filter set is applied to all luma CTBs of a slice and only one chroma ALF filter is applied to all chroma CTBs of a slice. However, there are two disadvantages to these applications. First, when statistical information among CTBs may greatly differ, and using the same ALF filter/filter set for all CTBs of a color component may limit the coding efficiency of ALF, especially for large-resolution sequences and mixed-content video sequences. Second, when deriving an ALF filter for a slice, the ALF filter cannot be calculated until the statistic information of the entire slice is collected. Therefore, such a use of ALF with a multiple-pass encoder is not conducive to low-delay applications. To solve this problem, one solution may be to use statistics from previous coded slices. However, this solution may cause some amount of performance loss.

In addition to luma 4×4 block level filter adaptation, VVC supports CTB level filter adaption. In a slice, different luma CTBs are allowed to use different luma filter sets and different chroma CTBs are able to use different chroma filters. In other words, a video coder, such as video encoder 200 or video decoder 300, may use different luma filter sets for different luma CTBs and/or different chroma filters (or filter sets) for different chroma CTBs of a slice. This CTB level filter adaptation may improve coding efficiency, especially for low-delay applications. In addition, VVC version 1 allows a CTBs to use filters from previously coded pictures. This temporal filter re-usage mechanism can reduce the overhead of signaling filter coefficients. In VVC version 1, up to seven signaled luma filter sets and eight signaled chroma filters can be applied to a slice. When there are not any signaled filters, one of 16 fixed filter sets can be applied to a luma CTB. When ALF is enabled, the filter set index of either a fixed filter set or a signaled luma filter set may be signaled for a luma CTB. The filter index of a signaled chroma filter may be signaled for a chroma CTB. By using filters signaled from previously coded pictures and/or fixed filters, when encoding a current CTU in a low delay application, three CTU-level on/off flags and a filter/filter set index may be decided by only using the statistic information of the current CTU. Therefore, the encoded bitstream of each CTU can be generated on the fly rather than waiting for the availability of the statistics of the whole picture.

Line buffer reduction is now discussed. As shown in FIG. 2, in the vertical direction, the filter shapes have 7 taps and 5 taps for luma and chroma components, respectively. As a result, in VTM-2.0, when decoding a row of CTUs, due to the delay of a deblocking filter and SAO, 7 luma and 4 chroma lines of an upper CTU row are stored in a line buffer for ALF. However, the extra line buffers require relatively large chip areas, especially for high definition (HD) and ultra high definition (UHD) video sequences.

To make ALF hardware conducive, a virtual boundary (VB) may be applied to remove or reduce the line buffer overhead for ALF. Considering the deblocking filter and SAO in VVC version 1, the position of a VB may be 4 luma samples and 2 chroma samples above a horizontal CTU boundary. When one sample on one side of a VB is filtered, the samples on the other side of the VB may not be utilized.

Figure 7A:
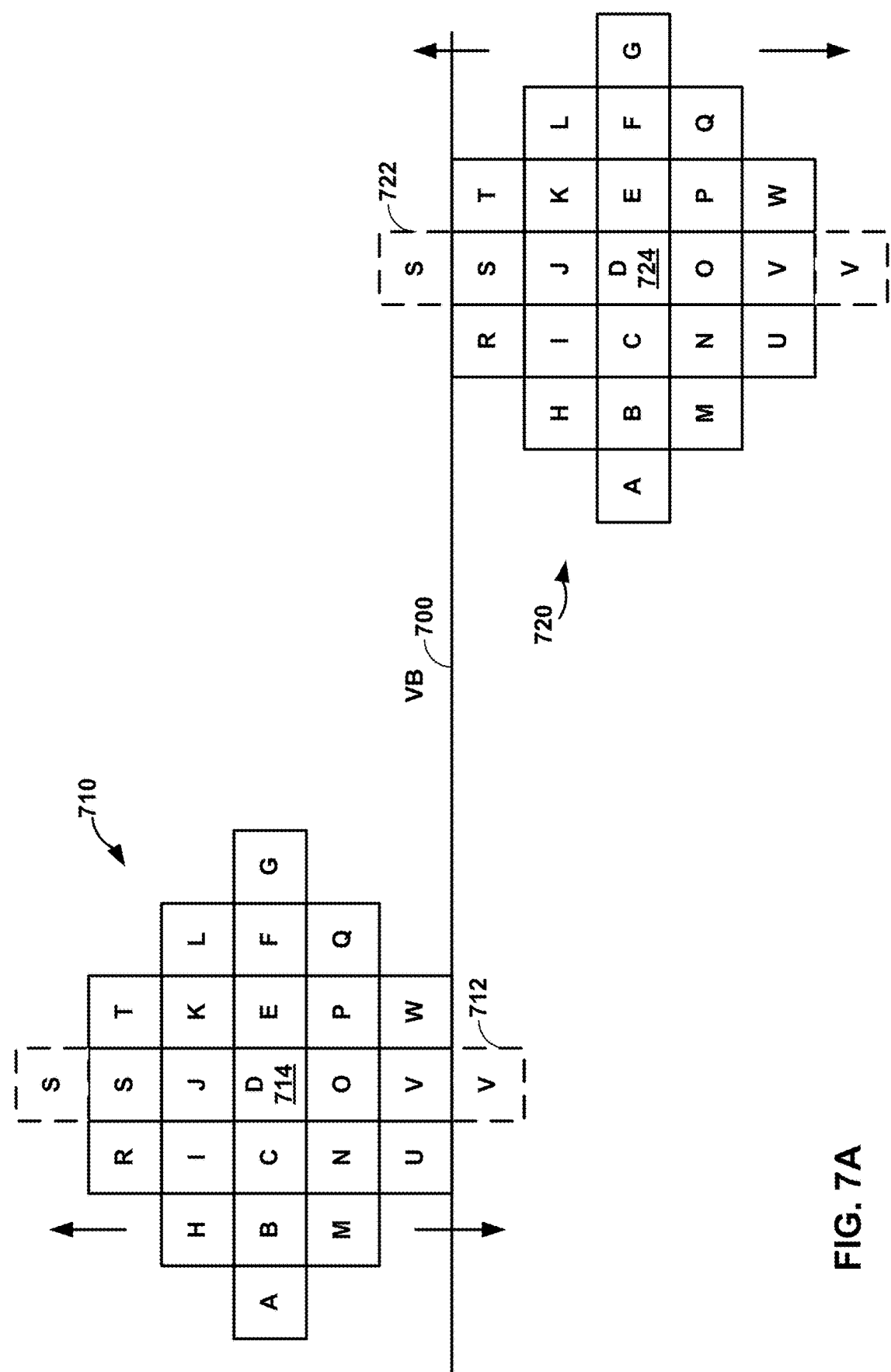
FIGS. 7A-7C are conceptual diagrams illustrating example symmetrical sample paddings of luma ALF filtering at an ALF virtual boundary.
Figure 7B:
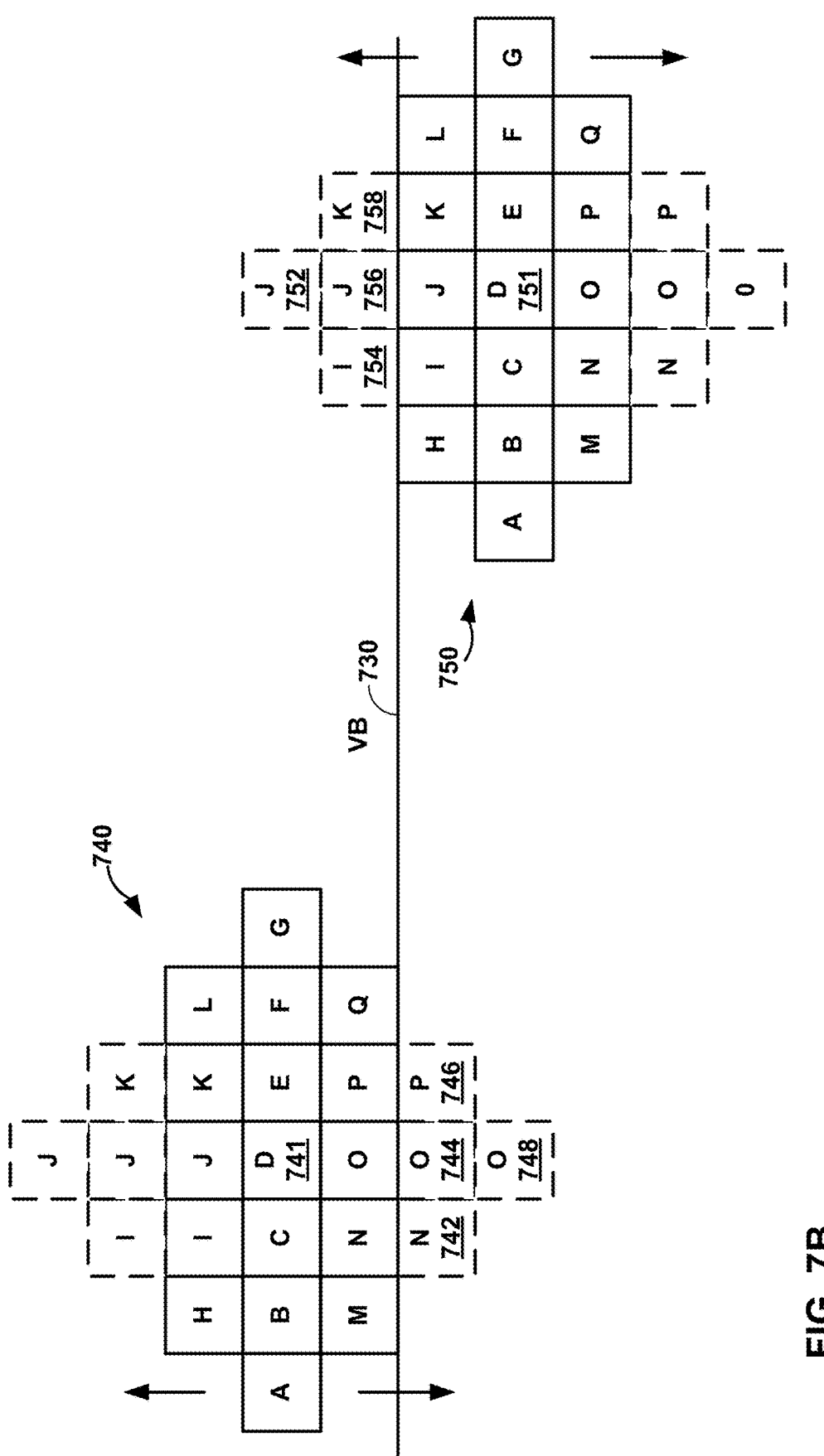
Figure 7C:
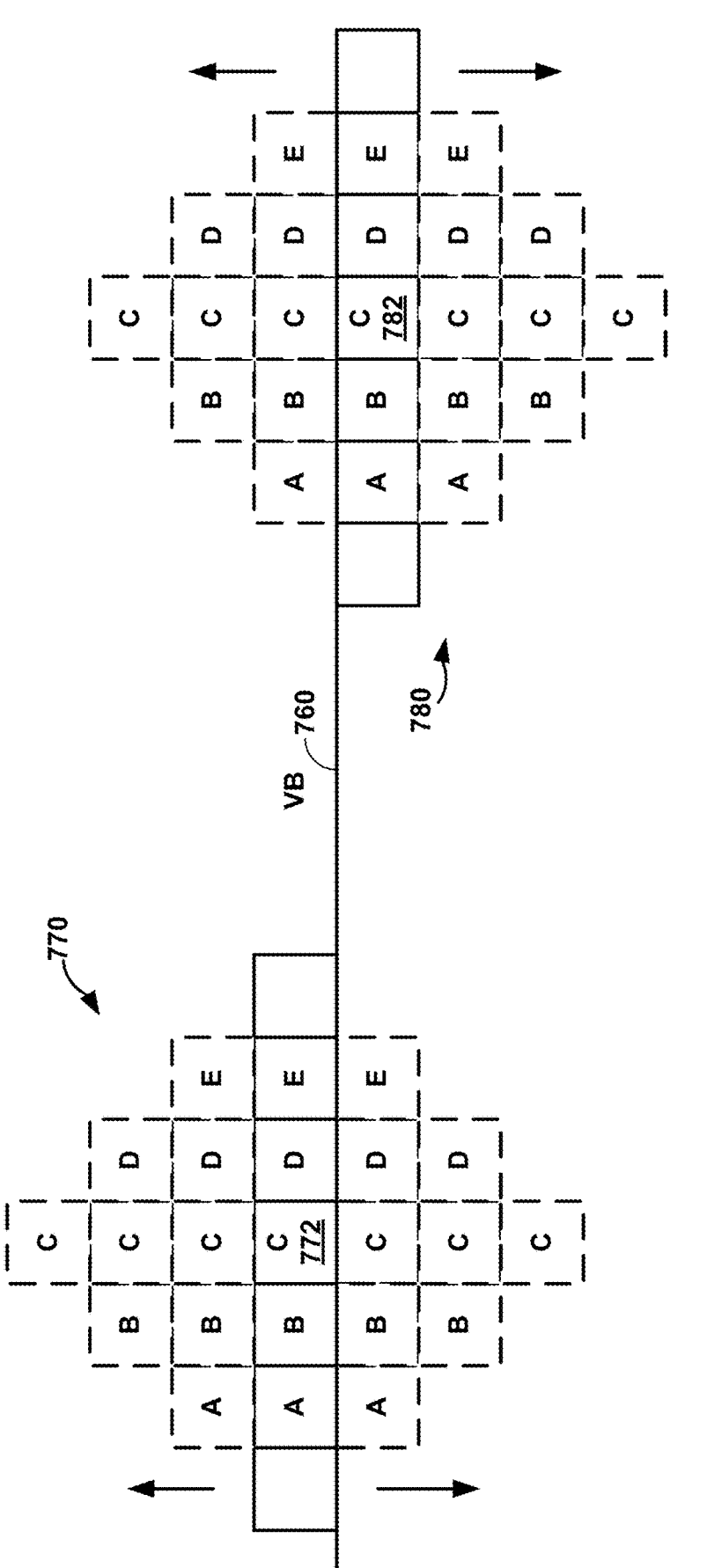

FIGS. 7A-7C are conceptual diagrams illustrating example symmetrical sample paddings of luma ALF filtering at an ALF virtual boundary. Modified filtering with symmetrical sample padding may be applied as shown in FIGS. 7A-7C, where the center square is the position of current to-be-filtered sample and the horizontal line is the position of a VB. For example, in FIG. 7A, VB 700 intersects filter 710 placing a sample 712 on an opposite side of VB 700 than the current to-be-filtered sample 714 and intersects filter 720 placing a sample 722 on an opposite side of VB 700 than the current to-be-filtered sample 724. Values for such samples may be padded with the value for a sample immediately adjacent across VB 700. For example, the value for sample 712 in filter 710 may be padded with the value of sample V. Similarly, the value for sample 722 in filter 720 may be padded with the value of sample S.

In FIG. 7B, VB 730 intersects filter 740 placing samples 742, 744, 746, and 748 on an opposite side of VB 730 than the current to-be-filtered sample 741 and intersects filter 725 placing samples 752, 754, 756, and 758 on an opposite side of VB 730 than the current to-be-filtered sample 751. Values for such samples may be padded with the value for a sample adjacent across VB 730. For example, the value for sample 742 may be padded with the value of sample N, the value for sample 744 may be padded with the value of sample O, the value for sample 746 may be padded with the value of sample P, and the value for sample 748 may be padded with the value of sample O. Similarly, for filter 750, the value for sample 752 may be padded with the value of sample J, the value for sample 754 may be padded with the value of sample I, the value for sample 756 may be padded with the value for sample J, and the value for sample 758 may be padded with the value for sample K.

However, when a current to-be-filtered sample (e.g., sample 772 or 782) is on the closest row on each side of a VB 760, as shown in FIG. 7C with respect to filters 770 and 780, the 2D filter is equivalent to a horizontal filter. This may introduce visual artifacts. To solve that issue, filter strength may be compensated when a current to-be-filtered sample is on the closest row on each side of a VB, as shown in equation (10). Comparing equation (10) with equation (2), 3 more bits are right shifted.

$$\tilde{R}(x, y) = R(x, y) + \left[ \sum_{i=0}^{N-2} c_i(f_{i,0} + f_{i,1}) + 512 \right] \gg 10 \tag{10}$$

Figure 8:
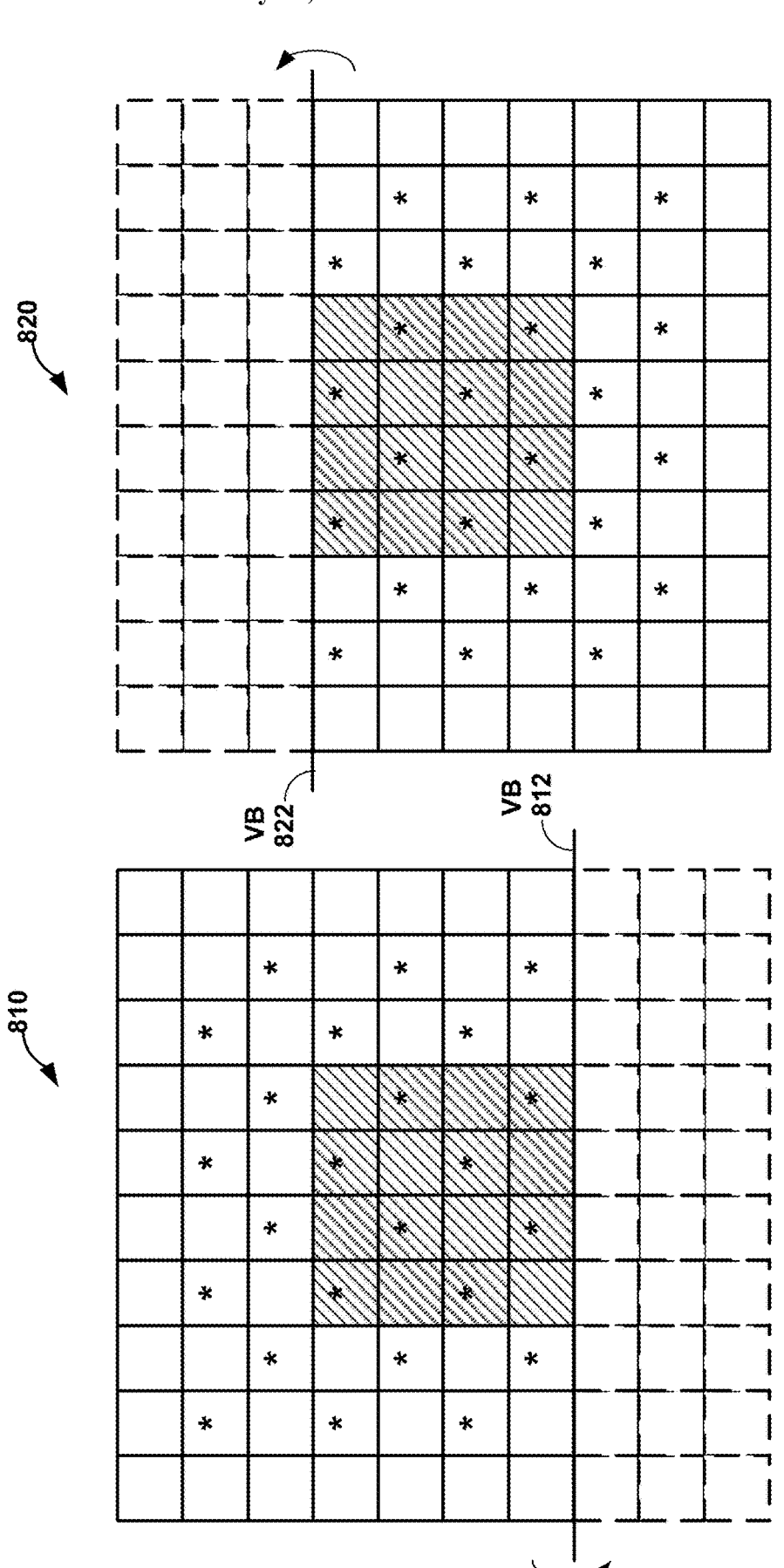
FIG. 8 is a conceptual diagram illustrating an example ALF 4×4 sub-block classification at an ALF virtual boundary.

FIG. 8 is a conceptual diagram illustrating an example ALF 4×4 sub-block classification at an ALF virtual boundary. When processing is applied, classification of a 4×4 block (e.g., the hashed area of window 810 or 820) may also be modified. When calculating a class index of a 4×4 block on one side of a VB (e.g., VB 812 or VB 822), the gradients and samples on the other side of the VB may not be used as shown in FIG. 8. When calculating gradient values of samples adjacent to a VB, the samples on the other side of the VB may not be utilized. Therefore, the boundary samples of the current side may be repetitively extended as shown in FIG. 8. Since the number of available gradient values is reduced, the activity derivation in equation (8) is re-scaled as where BD is bit depth:

$$A = \left( \sum_{k=i-2}^{i+5} \sum_{l=j-2}^{j+5} (V_{k,l} + H_{k,l}) * 3 \right) \gg (BD - 1) \tag{11}$$

Filter coefficient signaling is now discussed. In VVC version 1, ALF coefficients may be signaled in ALF adaptation parameter sets (APS). One APS may contain one set of luma filters with up to 25 filters, up to 8 chroma filters, and up to 8 cross-component ALF (CC-ALF) filters. Each set of luma filters support applying ALF to the luma 25 classes. In VVC version 1, up to 8 ALF_APSs are supported. An excerpt of VVC version 1 is set forth below.

| | Descriptor |
|---|---|
| alf_data( ) { | |
|   alf_luma_filter_signal_flag | u(1) |
|   if( aps_chroma_present_flag ) { | |
|     alf_chroma_filter_signal_flag | u(1) |
|     alf_cc_cb_filter_signal_flag | u(1) |
|     alf_cc_cr_filter_signal_flag | u(1) |
|   } | |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0 ) | |
|       for( filtIdx = 0; filtIdx < NumAlfFilters; filtIdx++ ) | |
|         alf_luma_coeff_delta_idx[ filtIdx ] | u(v) |
|     for( sfIdx = 0; sfIdx <= alf_luma_num_filters_signalled_minus1; sfIdx++ ) | |
|       for( j = 0; j < 12; j++ ) { | |
|         alf_luma_coeff_abs[ sfIdx ][ j ] | ue(v) |
|         if( alf_luma_coeff_abs[ sfIdx ][ j ] ) | |
|           alf_luma_coeff_sign[ sfIdx ][ j ] | u(1) |
|       } | |

-continued

| | Descriptor |
|---|---|

```
    if( alf_luma_clip_flag )
        for( sfIdx = 0; sfIdx <= alf_luma_num_filters_signalled_minus1; sfIdx++ )
            for( j = 0; j < 12; j++ )
                alf_luma_clip_idx[ sfIdx ][ j ]                                    u(2)
}
if( alf_chroma_filter_signal_flag ) {
    alf_chroma_clip_flag                                                          u(1)
    alf_chroma_num_alt_filters_minus1                                             ue(v)
    for( altIdx = 0; altIdx <= alf_chroma_num_alt_filters_minus1; altIdx++ ) {
        for( j = 0; j < 6; j++ ) {
            alf_chroma_coeff_abs[ altIdx ][ j ]                                   ue(v)
            if( alf_chroma_coeff_abs[ altIdx ][ j ] > 0 )
                alf_chroma_coeff_sign[ altIdx ][ j ]                              u(1)
        }
        if( alf_chroma_clip_flag )
            for( j = 0; j < 6; j++ )
                alf_chroma_clip_idx[ altIdx ][ j ]                                u(2)
    }
}
if( alf_cc_cb_filter_signal_flag ) {
    alf_cc_cb_filters_signalled_minus1                                           ue(v)
    for( k = 0; k < alf_cc_cb_filters_signalled_minus1 + 1; k++ ) {
        for( j = 0; j < 7; j++ ) {
            alf_cc_cb_mapped_coeff_abs[ k ][ j ]                                  u(3)
            if( alf_cc_cb_mapped_coeff_abs[ k ][ j ] )
                alf_cc_cb_coeff_sign[ k ][ j ]                                    u(1)
        }
    }
}
if( alf_cc_cr_filter_signal_flag ) {
    alf_cc_cr_filters_signalled_minus1                                           ue(v)
    for( k = 0; k < alf_cc_cr_filters_signalled_minus1 + 1; k++ ) {
        for( j = 0; j < 7; j++ ) {
            alf_cc_cr_mapped_coeff_abs[ k ][ j ]                                  u(3)
            if( alf_cc_cr_mapped_coeff_abs[ k ][ j ] )
                alf_cc_cr_coeff_sign[ k ][ j ]                                    u(1)
        }
    }
}
}
```

Figure 9:
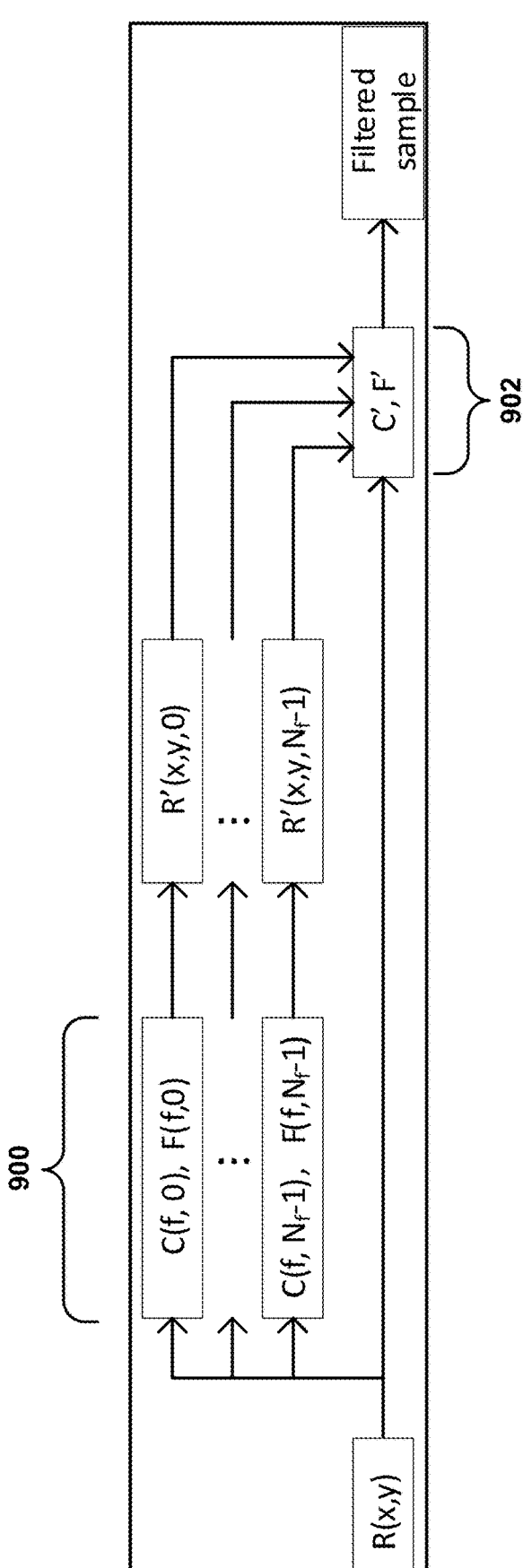
FIG. 9 is a conceptual diagram illustrating an example ALF framework with multiple classifiers.

FIG. 9 is a conceptual diagram illustrating an example ALF framework with multiple classifiers. Adaptive loop filters with multiple classifiers are now discussed. In VVC, when filtering a sample, only one classifier and one filter can be applied. To improve the performance of ALF over that disclosed in VVC, in U.S. Patent Publication 2022-0201292, published on Jun. 23, 2022, an ALF framework based on multiple classifiers is disclosed, for example, as shown in FIG. 9. When filtering a sample, as shown in FIG. 9, multiple classifiers may be applied. A filter is applied to the sample corresponding to a classifier. In FIG. 9, there are two stages. For example, video encoder 200 or video decoder 300 may apply two stages of filtering. First (first stage), a pre-filtering stage 900 includes filter set F(f, i) with i=0 . . . $N_f$−1 and the classifier C(f, i) with i=0 . . . $N_f$−1 of the ith fixed filter set. Second (second stage), final-filtering stage 902 includes a signaled filter or a predefined filter set F', and the corresponding classifier C'.

Figure 10:
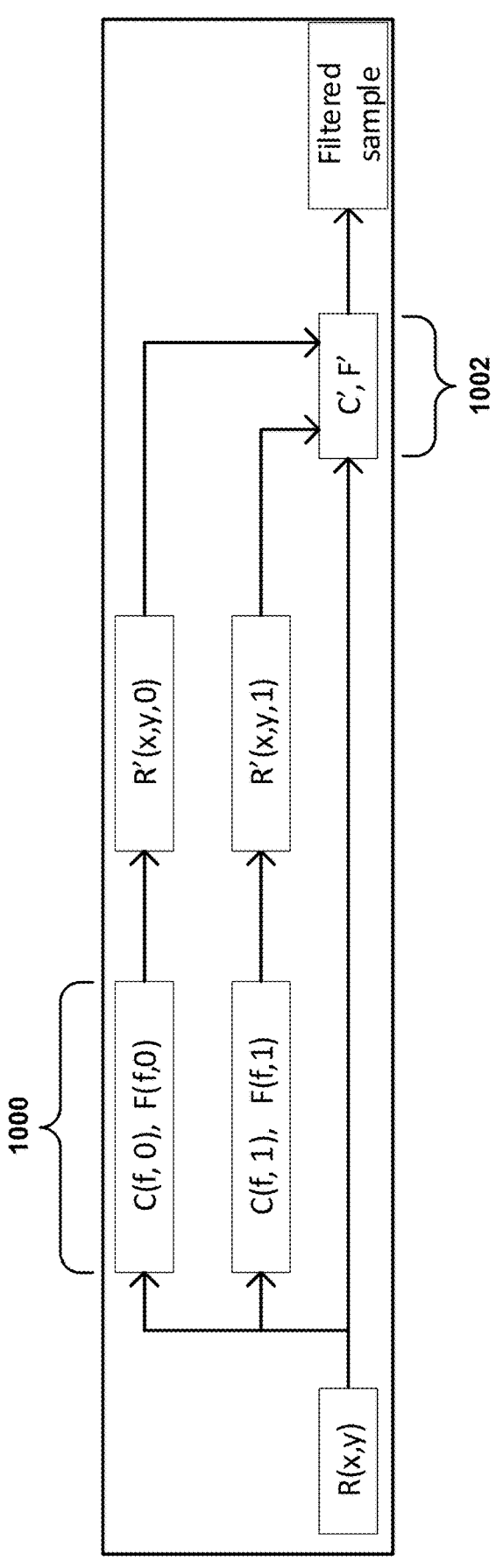
FIG. 10 is a conceptual diagram illustrating an example ALF framework with three classifiers.

FIG. 10 is a conceptual diagram illustrating an example ALF framework with three classifiers. In Chang, et al. "Compression efficiency methods beyond VVC," Joint Video Experts Team (JVET) of ITU-T SG 16 WP 3 and ISO/IEC JTC 1/SC 29/WG 11, 21st Meeting: by Teleconference, 6-15 Jan. 2021, JVET-U0100, which is adopted in ECM-1.0, an ALF framework with $N_f$=2 is proposed as shown in FIG. 10. For example, first stage 1000 includes two filters and two classifiers, and second stage 1002 includes the signaled filter or a predefined filter set F', and the corresponding classifier C', for a total of three classifiers.

In ECM-1.0, in a classifier C(f, i) with i=0 or 1, activity and direction values may be determined based on 2-D Laplacian values.

Like VVC, the activity value $A_i$ and directionality value $D_i$ may be derived by using vertical and horizontal gradients.

$A_i$ may be further quantized to the range of 0 to $M_{A,i}$−1 inclusive, and the quantized value may be denoted as $\hat{A}_i$. The of value $D_i$ may be in the range of 0 to $M_{D,i}$−1, inclusive.

Class index $C_i$ may be derived as $C_i = \hat{A}_i * M_{D,i} + D_i$.

Based on $C_i$, a filter from C(f, i) may be selected.

The second stage (second stage 902 or 1002) is now discussed. In the second stage, F' is a signaled filter or a predefined filter set and C' is the corresponding classifier. The intermediate filtered results may be further filtered with current sample and/or neighbors of the current sample. C' may be used to determine which filter in F' is applied and how to transpose the coefficients.

C' may use the R and/or R' to determine the filter index for filter set F' by calculating activity and directions as the first stage. In some examples, a transpose may be applied when applying F'. For example, video encoder 200 or video decoder 300 may apply a transpose.

In ECM-7.0, a two-classifier based classification is applied to each 2×2 block to choose a filter from a signaled filter set as was disclosed in U.S. Patent Publication No. 2023-0010869 A1, published on Jan. 12, 2023. For each 2×2 block, a Laplacian-based or a band-based classifier may be applied to a CTB. A Laplacian-based classifier may assign a class index for one or more samples values of a block of video data based on values of the neighboring samples of the one or more sample values. A band-based classifier may assign a class index to the one or more sample values of the block irrespective of values of neighboring samples of the one or more sample values. In some examples, video encoder 200 or video decoder 300 may switch C' between a Laplacian-based classifier and a band-based classifier.

The selection may be signaled for each filter set in an APS. The classifiers may be applied to input to ALF.

When the Laplacian-based technique is applied, like VVC, the activity value A may be derived by using vertical and horizontal gradients (see FIG. 4). Then A may be further quantized to the range of 0 to $M_A-1$ inclusive, and the quantized value may be denoted as $\hat{A}$. A directionality value D with the range of 0 to $M_D-1$ may be derived based by using vertical and horizontal gradients.

Then the class index $C'=\hat{A}*M_D+D$. For example, video encoder 200 or video decoder 300 may determine the class index using a Laplacian-based classifier.

When the band-based classification technique is applied with N classes, the dynamic range of the value (for example, the value of a sample or the sum of sample values of a block) may be divided into N non-overlapped intervals, uniformly or non-uniformly. For example, video encoder 200 or video decoder 300 may determine the class index using a band-based classifier. When classifying a sample or a block, the value of a sample or the sum of sample values of a block may be derived. The interval index of the sample value or the sum may be used as the class index. For example, when the dynamic range of a sum of a block is uniformly partitioned into N intervals, the class index may be derived as $$(\text{sum}*N)>>\{\text{bitdepth}+[\log 2(\text{num of samples in the block})]\}$$

where bitdepth is the bit depth of a sample value.

Filtering is now discussed. After obtaining the class index of a sample from C', a filter from the filter set F' may be chosen based on the class index. For example, video encoder 200 or video decoder 300 may determine or select a filter based on the class index. Video encoder 200 or video decoder 300 may apply the determined filter. The filtering may be applied as $$\tilde{R}(x, y) = R(x, y) + \left[\sum_{i=0}^{N_0-2} c_i(f_{i,0} + f_{i,1})\right] + \left[\sum_{i=N_0}^{N_0+N_1-1} c_i g_i\right] \quad (12)$$

In the above equation (12), the filtering is separated into 2 parts.

$$\text{Filter part 1:} \left[\sum_{i=0}^{N_0-2} c_i(f_{i,0} + f_{i,1})\right]$$

includes filtering by using neighboring samples, in which geometric transformation may be applied. $N_0$ is the number of coefficients. The filter may be a 5×5, 7×7, 9×9, 11×11, or 13×13 diamond filter and be applied as shown in FIG. 9.

$$\text{Filter part 2:} \left[\sum_{i=N_0}^{N_0+N_1-1} c_i g_i\right]$$

includes filtering by using intermediately filtered samples, in which geometric transformation may be applied. $N_1$ is the number of coefficients.

The function $f_{i,j}$ with j=0 or 1 may be defined with clipping functions as $$f_{i,j} = f_{i,j}(R(x + x_{i,j}, y + y_{i,j}), R(x, y)) = \quad (13)$$
$$\min (b_i, \max (-b_i, R(x + x_{i,j}, y + y_{i,j}) - R(x, y)))$$

The function $g_i$ may be defined with clipping functions as $$g_i = g_i(R'(x, y, i - N_0), R(x, y)) = \quad (14)$$
$$\min (b_i, \max(-b_i, R'(x, y, i - N_0) - R(x, y)))$$

$b_i$ is the clipping parameter corresponding to coefficient $c_i$. In ECM-1.0, $N_1=2$.

In ECM-7.0 and VVC, a signaled filter can be applied to filter a sample. For example, video encoder 200 may apply a filter and signal the filter in a bitstream to video decoder 300 which may parse the filter to determine the filter to apply. For each CTU, a signaled filter set may be applied to each color component. Classification may be applied to each block and a class index may be determined. With this class index, the corresponding filter from the filter set may be determined to be applied to the samples in the block.

In both VVC and ECM-7.0, both Laplacian-based and band-based classifiers may be applied to the input of ALF, which are the samples in a reconstruction domain. A reconstruction domain may be a domain of reconstructed samples, for example, after any inverse-transform is applied. For example, video encoder 200 or video decoder 300 may apply Laplacian-based and/or band-based classifiers to samples in the reconstruction domain to determine a class index. The same samples in the reconstruction domain may be input to a selected ALF filter, which video encoder 200 or video decoder 300 may select based on the class index.

According to the techniques of this disclosure, video encoder 200 or video decoder 300 may apply one or more other types of adaptive loop filter classifiers. For example, video encoder 200 or video decoder 300 may apply a sum of absolute values classifier to reconstructed residual sample values. A sum of absolute values classifier may be a classifier that uses the sum of absolute values of one or more samples neighboring a to-be-filtered to determine a class index for the to-be-filtered sample. Additionally, or alternatively, video encoder 200 or video decoder 300 may apply classifiers to sample values in other domains.

Video encoder 200 or video decoder 300 may apply one or more classifiers to inputs (e.g., one or more different types of inputs) to determine a class index. Video encoder 200 or video decoder 300 may use the class index to determine or select an adaptive loop filter to apply to a current to-be-filtered sample.

In one example, video encoder 200 or video decoder 300 may apply one or more classifiers to predictors to determine a class index. In one example, video encoder 200 or video decoder 300 may apply one or more classifiers to de-quantized coefficients. For example, video encoder 200 or video decoder 300 may apply one or more classifiers to transform coefficients after de-quantization. In one example, video encoder 200 or video decoder 300 may apply one or more classifiers to reconstructed residual sample values. In one example, video encoder 200 or video decoder 300 may apply one or more classifiers to absolute values of reconstructed residual sample values. In one example, video encoder 200 or video decoder 300 may apply one or more classifiers to samples before applying a deblocking filter. In one example, video encoder 200 or video decoder 300 may apply one or more classifiers to any combination of the sample values of the above types (e.g., the sample types discussed above).

According to the techniques of this disclosure, video encoder 200 or video decoder 300 may apply a classifier to a type of sample values or to several types of sample values discussed above, to determine a class index of a current to-be-filtered sample. For example, video encoder 200 or video decoder 300 may apply a classifier to a single type of sample values or a plurality of types of sample values. The output of the classifier (e.g., the class index) may be used to select a filter. In some examples, video encoder 200 or video decoder 300 may apply a classifier so as to select one or more fixed filters. In some examples, video decoder 300 may apply a classifier so as to select one or more signaled filters. For example, video encoder 200 may signal a plurality of filters in a bitstream. Video decoder 300 may determine the plurality of filters from the bitstream and may select one or more of the signaled filters to apply based on the application of a classifier.

In some examples, video encoder 200 or video decoder 300 may apply a classifier to a block of size m*n, when m and n are 1, (e.g., this may be equivalent to applying the classifiers to a sample). To determine the class index of a block, video encoder 200 or video decoder 300 may use a surrounding window of samples with size p*q. For example, the window of samples may be larger than the block size so as to surround the block, e.g., as shown in FIGS. 3 and 8.

Similar to VVC and ECM, video encoder 200 or video decoder 300 may utilize a Laplacian-based classifier to determine a class index for a current to-be-filtered sample. For example, video encoder 200 or video decoder 300 may calculate gradient values of samples in the window with a size p*q. For example, the activity value A may be derived by using vertical and horizontal gradients. Then A may be further quantized to the range of 0 to $M_A-_1$ inclusive, and the quantized value may be denoted as Â. A directionality value D with the range of 0 to $M_D-1$ may be derived based by using vertical and horizontal gradients. The class index C' may be determined as C'=Â*$M_D$+D.

In some examples, video encoder 200 or video decoder 300 may use a band-based classifier to determine a class index for a current to-be-filtered sample. For example, video encoder 200 or video decoder 300 may determine the sum of the sample values in the window, and derive the class index as C'=sum/f, where f may be a scaling factor. In some examples, when the sum is negative, video encoder 200 or video decoder 300 may derive C' may be as |sum|/f. Alternatively, C' may be set as a default value, e.g., 0.

In some examples, video encoder 200 or video decoder 300 may use a sum of absolute values classifier to determine a class index for a current to-be-filtered sample. For example, video encoder 200 or video decoder 300 may determine the sum of the absolute sample values (or sum of absolute residual values) in the window. In some examples, video encoder 200 or video decoder 300 derive the class index as C'=sum/f, where f is a scaling factor.

In some examples, video encoder 200 or video decoder 300 may use a sum of squared values classifier to determine a class index for a current to-be-filtered sample. For example, video encoder 200 or video decoder 300 may determine the sum of the squared sample values of the samples in the window by squaring the value of each sample and summing the results of all samples in the window. In some examples, video encoder 200 or video decoder 300 may derive the class index as C'=sum/f, where f is a scaling factor.

In some examples, video encoder 200 or video decoder 300 may use a variance classifier to determine a class index of a current to-be-filtered sample. For example, video encoder 200 or video decoder 300 may determine the variance of sample values in the window. In some examples, video encoder 200 or video decoder 300 may derive the class index as C'=variance/f, where f is a scaling factor.

In some examples, video encoder 200 or video decoder 300 use an entropy classifier to determine a class index for a current to-be-filtered sample. For example, video encoder 200 or video decoder 300 may derive a histogram/distribution of the sample values in the window as, $$p(x) = \frac{n_x}{(p*q)}$$

where p and q are the block width and height, and $n_x$ is the number of sample values equal to x.

Video encoder 200 or video decoder 300 may derive the entropy of the sample values based on the distribution as $$H(X) = -\sum_x p(x)\log p(x).$$

Video encoder 200 or video decoder 300 may derive the class index as C'=H(X)/$f$, where $f$ is a scaling factor. Alternatively, the class index may be derived by using a nonlinear transformation=F( ), C'=F (H(X)*$f$) e.g., C'=exp (H(X)*$f$), where $f$ is a scaling factor.

In some examples, video encoder 200 or video decoder 300 may use a total variation classifier to determine a class index for a current to-be-filtered sample. For example, video encoder 200 or video decoder 300 may determine the total variation of the sample values (e.g., the sum of gradient norms) in the window, and derive the class index as C'=(total variation)/$f$, where $f$ is a scaling factor.

In some examples, the range of class index C' may be from 0 to M. When C' is less than 0, C' may be set as 0. When C' is larger than M, C' may be set as M. In one example, M=24.

In some examples, the scaling factor f may depend on, or be based on, a quantization parameter (QP), a quantization step size, a prediction mode, and/or a sample bit depth. In one example, f=sample bit depth−constant value.

In some examples, when a classifier is applied, video encoder 200 or video decoder 300 may apply geometric transpose to a selected filter. For example, video encoder 200 or video decoder 300 may transpose filter coefficients, such as discussed with respect to FIG. 6 above. The geometric transpose may be derived based on the techniques of ECM-7.0 or VVC. In one example, the geometric transpose may be determined based on one of the following sample values: predictors, de-quantized coefficients, reconstructed residual sample values and reconstructed sample values (e.g., input to ALF). In another example, geometric transpose may not be applied. For example, video encoder 200 or video decoder 300 may not apply, or may refrain from applying, a geometric transpose to the filtering when a specific classifier is applied.

The classifier and data usage choice (e.g., the type of classifier input, such as predictors, de-quantized coefficients, reconstructed residual sample values, absolute values of reconstructed residual sample values, samples before deblocking filtering, and/or the like) may be signaled for each filter set at an APS level. For instance, one or more syntax elements in an APS may indicate the classifier and data usage choice. Alternatively, the classifier and data usage choice may be signaled at a picture level, a slice level, a CTB level, or a block level. For example, video encoder 200 may signal the classifier and data usage choice, for example, in one or more syntax elements in a bit stream. Video decoder 300 may parse one or more syntax elements in a bitstream to determine the classifier and the data usage choice.

FIG. 11 is a flow diagram illustrating example adaptive loop filter classifier techniques in accordance with one or more aspects of this disclosure. Video encoder 200 or video decoder 300 may apply a sum of absolute values classifier to reconstructed residual sample values to determine a class index. For example, video encoder 200 or video decoder 300 may determine a sum of absolute values of one or more reconstructed residual sample values within a window associated with a block of video data (1100). For example, video encoder 200 or video decoder 300 may sum the absolute values of reconstructed residual sample values within a window of size p*q that surrounds the block of video data, such as windows 360 (FIG. 3), 810 or 820 (FIG. 8). Video encoder 200 or video decoder 300 may determine a class index based at least in part on the sum of absolute values (1102). For example, the output of the application of the sum of absolute values classifier may be a class index or video encoder 200 or video decoder 300 may scale the output of the application of the sum of absolute values classifier to determine the class index.

Video encoder 200 or video decoder 300 may determine an adaptive loop filter based on the class index (1104). For example, the class index may identify an adaptive loop filter to be applied to filter a current to-be-filtered sample of the block.

Video encoder 200 or video decoder 300 may apply the adaptive loop filter to the current to-be-filtered sample of the block (1106). For example, video encoder 200 or video decoder 300 may adaptive loop filter the current to-be-filtered sample using the adaptive loop filter associated with the class index.

Video encoder 200 or video decoder 300 may code the block based on the application of the adaptive loop filter (1108). For example, video encoder 200 may encode the block based on the application of the adaptive loop filter or video decoder 300 may decode the block based on the application of the adaptive loop filter. For example, video encoder 200 or video decoder 300 may apply one or more adaptive loop filters to samples of each of the blocks of a frame of the video data and store the filtered frame in a decoded picture buffer. Video encoder 200 may use the stored contents of the decoded picture buffer of the decoding loop of video encoder 200 as predictors for other blocks in the same frame or blocks in subsequent frames.

In some examples, video encoder 200 or video decoder 300 determine the sum of absolute values and determine the class index when applying a sum of absolute values classifier to the one or more reconstructed residual sample values within the window. In some examples, the adaptive loop filter includes a fixed adaptive loop filter or an adaptive loop filter signaled in a bitstream. In some examples, the class index is restricted to be in a range of 0 to a positive integer value, such as 24. In some examples, the class index is further based on a scaling factor (e.g., scaling factor f, as discussed above). For example, video encoder 200 or video decoder 300 may divide the sum of absolute values by a scaling factor. In some examples, the scaling factor is based on at least one of a quantization parameter, a quantization step size, a prediction mode, or a sample bit depth. In some examples, the class index is based on the sum of the absolute values divided by the scaling factor.

In some examples, video encoder 200 or video decoder 300 may refrain from applying a geometric transpose to the adaptive loop filter. In other examples, video encoder 200 or video decoder 300 may apply a geometric transpose to the adaptive loop filter.

In some examples, video decoder 300 may parse, from a bitstream, an identification of a classifier indicative of a sum of absolute values classifier and an indication that the reconstructed residual sample values are to be input to the classifier.

In some examples, the current to-be-filtered sample is a first current to-be-filtered sample, the window is a first window, the class index is a first class index, the adaptive loop filter is a first adaptive loop filter, and the block is a first block. In some examples, video encoder 200 or video decoder 300 may apply a classifier to one or more inputs associated with a second window associated with a second block of the video data to determine a second class index. For example, the one or more inputs may include or be derived from samples within the second window. In some examples, video encoder 200 or video decoder 300 may apply a second adaptive loop filter to a second current to-be-filtered sample based on the second class index. In some examples, video encoder 200 or video decoder 300 may decode the second block based on the application of the second adaptive loop filter.

In some examples, the one or more inputs associated with the second window include predictors, de-quantized transform coefficients, reconstructed residual sample values, absolute values of reconstructed residual sample values, or samples before deblocking filtering. In some examples, the classifier includes a Laplacian-based classifier, a band-based classifier, a sum of absolute values classifier, a sum of square values classifier, a variance classifier, an entropy classifier, or a total variation classifier.

Figure 12:
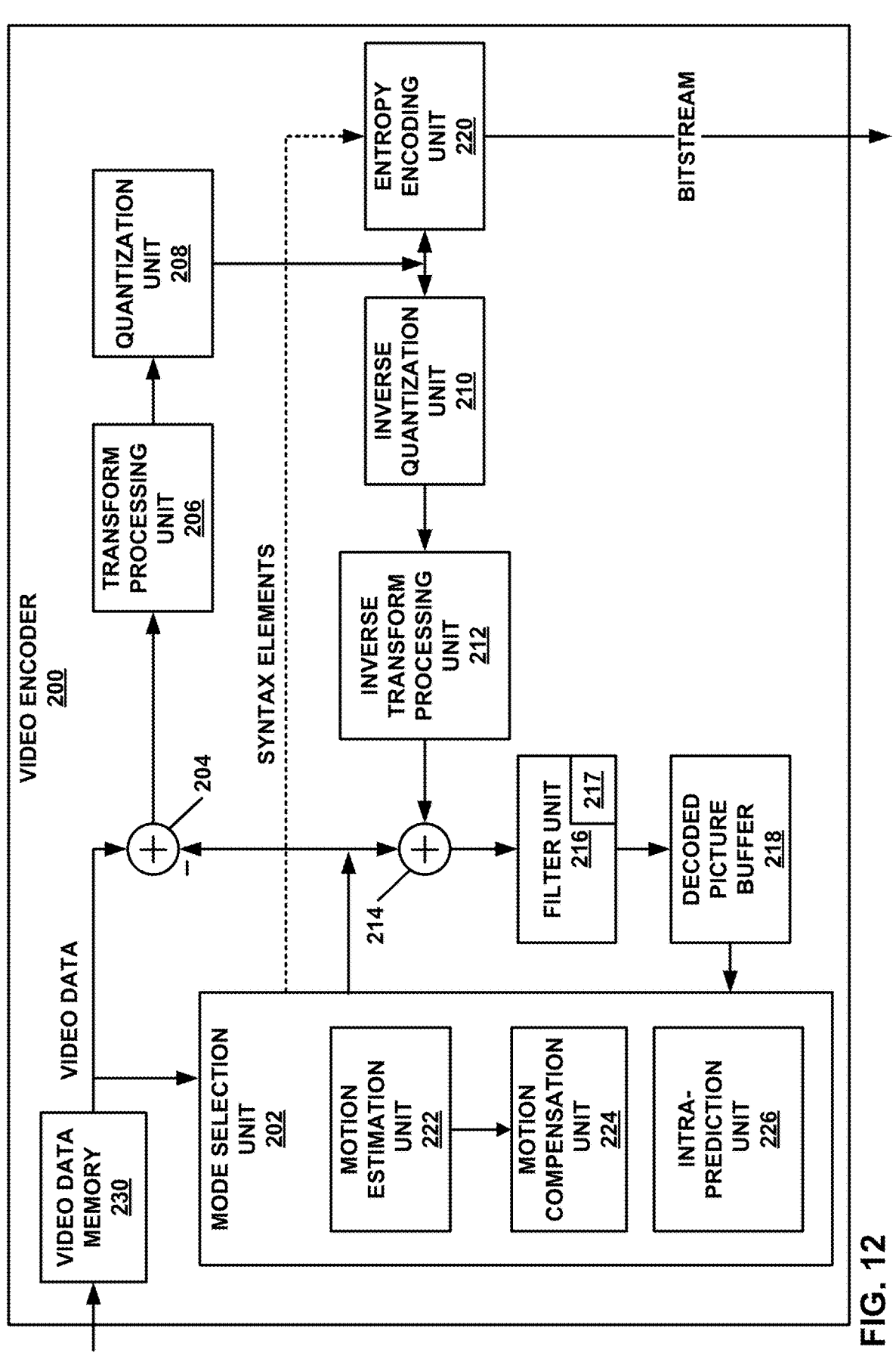
FIG. 12 is a block diagram illustrating an example video encoder that may perform the techniques of this disclosure.

FIG. 12 is a block diagram illustrating an example video encoder 200 that may perform the techniques of this disclosure. FIG. 12 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 12, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 12 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUS, quantization parameters for residual data of the CUS, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that define the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion)

based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform the ALF filtering techniques of FIG. 11. For example, filter unit 216 may include classifier(s) 217 and may use classifier(s) 217 to determine which ALF to apply to a given sample. For example, filter unit 216 may perform deblocking operations to reduce blockiness artifacts along edges of CUs. One or more operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including one or more memories configured to store the video data; and one or more processors implemented in circuitry and communicatively coupled to the one or more memories, the one or more processors being configured to: determine a sum of absolute values of the one or more reconstructed residual sample values within the window associated with a block of the video data; determine a class index based at least in part on the sum of absolute values; determine an adaptive loop filter based on the class index; apply the adaptive loop filter to a current to-be-filtered sample of the block; and encode the block based on the application of the adaptive loop filter.

Figure 13:
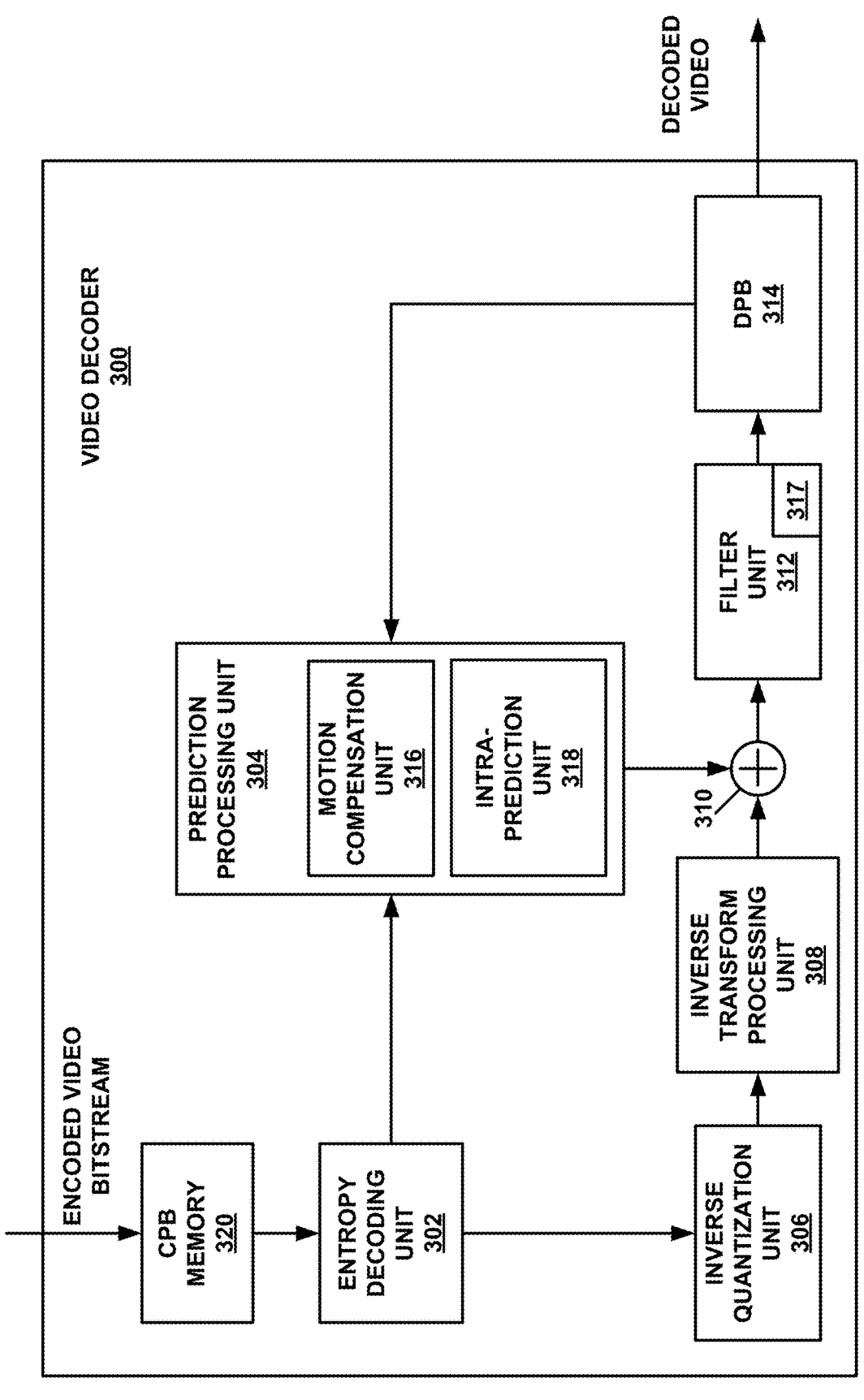
FIG. 13 is a block diagram illustrating an example video decoder that may perform the techniques of this disclosure.

FIG. 13 is a block diagram illustrating an example video decoder 300 that may perform the techniques of this disclosure. FIG. 13 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 13, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve encoded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 13 are illustrated to assist with understanding the operations performed by video decoder 300. The units may be implemented as fixed-function circuits, programmable circuits, or a combination thereof. Similar to FIG. 12, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 12).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 12). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform the ALF filtering techniques of FIG. 11. For example, filter unit 312 may include classifier(s) 317 and may use classifier(s) 317 to determine which ALF to apply to a given sample. For example, filter unit 312 may perform deblocking operations to reduce blockiness artifacts along edges of the reconstructed blocks. All operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including one or more memories configured to store the video data; and one or more processors implemented in circuitry and communicatively coupled to the one or more memories, the one or more processors being configured to: determine a sum of absolute values of the one or more reconstructed residual sample values within the window associated with a block of the video data; determine a class index based at least in part on the sum of absolute values; determine an adaptive loop filter based on the class index; apply the adaptive loop filter to a current to-be-filtered sample of the block; and decode the block based on the application of the adaptive loop filter.

Figure 14:
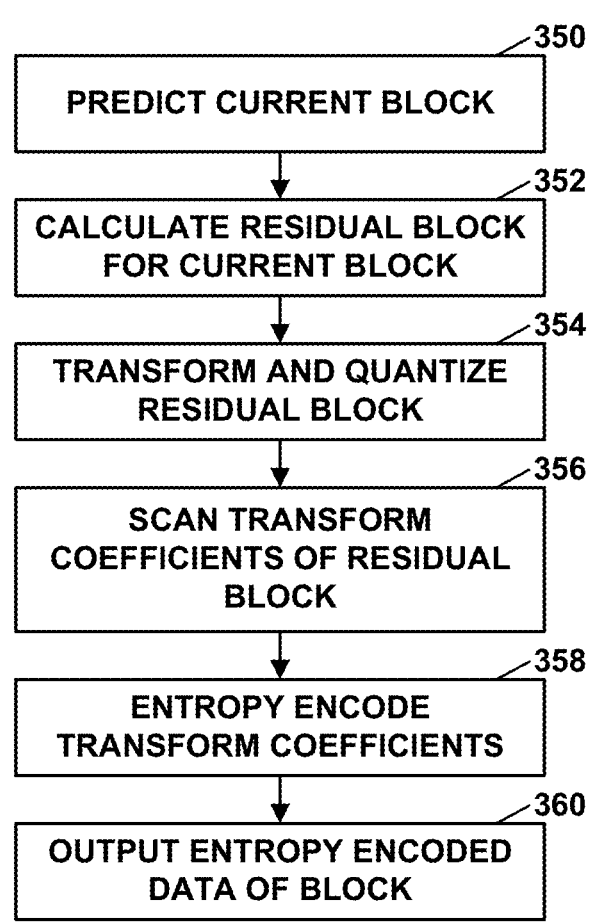
FIG. 14 is a flowchart illustrating an example method for encoding a current block in accordance with the techniques of this disclosure.

FIG. 14 is a flowchart illustrating an example method for encoding a current block in accordance with the techniques of this disclosure. The current block may be or include a current CU. Although described with respect to video encoder 200 (FIGS. 1 and 12), it should be understood that other devices may be configured to perform a method similar to that of FIG. 14.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360). In a decoding loop of video encoder 200, video encoder 200 may employ the techniques of FIG. 11 as part of filtering the current block before outputting the current block to decoded picture buffer 218.

Figure 15:
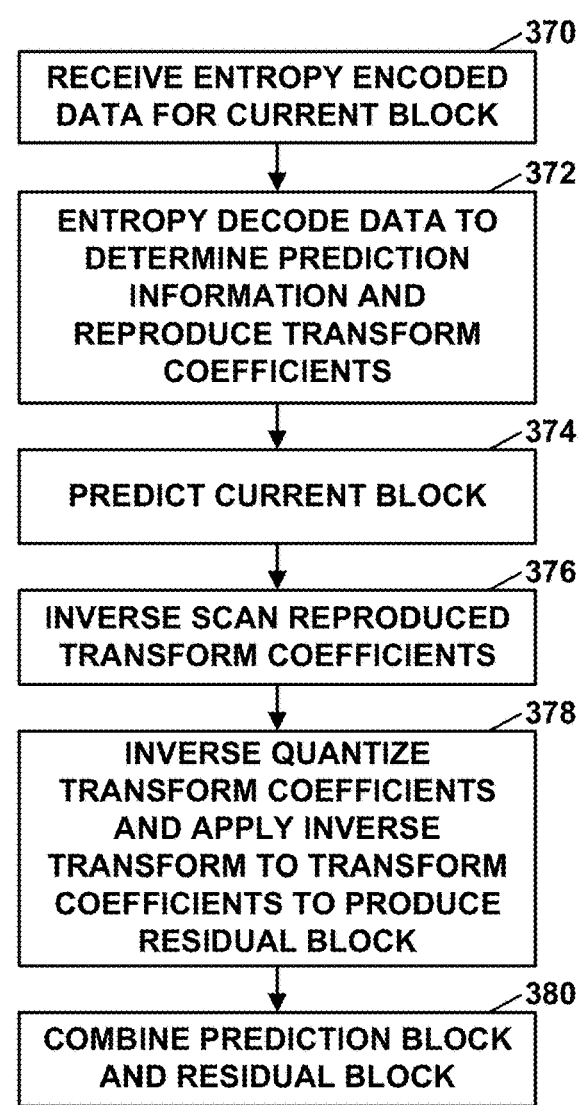
FIG. 15 is a flowchart illustrating an example method for decoding a current block in accordance with the techniques of this disclosure.

FIG. 15 is a flowchart illustrating an example method for decoding a current block of video data in accordance with the techniques of this disclosure. The current block may be or include a current CU. Although described with respect to video decoder 300 (FIGS. 1 and 13), it should be understood that other devices may be configured to perform a method similar to that of FIG. 15.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380). Video decoder 300 may employ the techniques of FIG. 11 as part of filtering the current block before outputting the current block for display.

The following numbered clauses illustrate one or more aspects of the devices and techniques described in this disclosure.

Clause 1A. A method of coding video data, the method comprising: applying a classifier to one or more samples of a first block of the video data, wherein the one or more samples of the first block are samples of a first type; applying an adaptive loop filter to the one or more samples of the first block based on the application of the classifier; and coding the first block based on the application of the adaptive loop filter.

Clause 2A. The method of clause 1A, wherein the first type comprises a domain other than a reconstruction domain.

Clause 3A. The method of clause 1A or clause 2A, wherein the first type comprises predictors, de-quantized coefficients, reconstructed residual sample values, absolute values of reconstructed residual sample values, or samples before deblocking filtering.

Clause 4A. The method of any of clauses 1A-3A, wherein the one or more samples are a first one or more samples, further comprising applying the classifier to a second one or more samples of the first block, wherein the second one or more samples are samples of a second type.

Clause 5A. The method of any of clauses 1A-3A, further comprising applying the classifier to one or more samples of a second block of the video data, wherein the one or more samples of the second block are samples of a second type.

Clause 6A. The method of clause 4A or clause 5A, wherein the second type comprises predictors, de-quantized coefficients, reconstructed residual sample values, absolute values of reconstructed residual sample values, or samples before deblocking filtering.

Clause 7A. The method of any of clauses 1A-6A, wherein the adaptive loop filter is a fixed adaptive loop filter or an adaptive loop filter indicated through signaling.

Clause 8A. The method of any of clauses 1A-7A, further comprising determining a class index.

Clause 9A. The method of clause 8A, wherein determining the class index comprises: determining gradient values of one or more samples within a window; determining an activity value based on the gradient values; determining a directionality value based on the gradient values; and determining the class index based at least in part on the activity value and the directionality value.

Clause 10A. The method of clause 8A, wherein determining the class index comprises: determining a sum of sample values of one or more samples within a window; and determining the class index based at least in part on the sum.

Clause 11A. The method of clause 8A, wherein determining the class index comprises: determining a sum of absolute sample values of one or more samples within a window; and determining the class index based at least in part on the sum.

Clause 12A. The method of clause 8A, wherein determining the class index comprises: determining a sum of squared sample values of one or more samples within a window; and determining the class index based at least in part on the sum.

Clause 13A. The method of clause 8A, wherein determining the class index comprises: determining a variance of sample values of one or more samples within a window; and determining the class index based at least in part on the variance.

Clause 14A. The method of clause 8A, wherein determining the class index comprises: determining a histogram of sample values of one or more samples within a window; determining an entropy of the sample values based on the histogram; and determining the class index based at least in part on the entropy.

Clause 15A. The method of clause 8A, wherein determining the class index comprises: determining a total variation of sample values of one or more samples within a window; and determining the class index based at least in part on the total variation.

Clause 16A. The method of any of clauses 8A-15A, wherein the class index is restricted to be in a range of 0 to M.

Clause 17A. The method of any of clauses 8A-16A, wherein the class index is further based on a scaling factor, and wherein the scaling factor is based on at least one of a quantization parameter, a quantization step size, a prediction mode, or a sample bit depth.

Clause 18A. The method of any of clauses 1A-17A, further comprising applying geometric transpose on the one or more samples of the first block.

Clause 19A. The method of any of clauses 1A-18A, further comprising signaling or parsing an identification of the classifier and a data usage.

Clause 20A. The method of any of clauses 1A-19A, wherein coding comprises decoding.

Clause 21A. The method of any of clauses 1A-20A, wherein coding comprises encoding.

Clause 22A. A device for coding video data, the device comprising one or more means for performing the method of any of clauses 1A-21A.

Clause 23A. The device of clause 22A, wherein the one or more means comprise one or more processors implemented in circuitry.

Clause 24A. The device of any of clauses 22A and 23A, further comprising a memory to store the video data.

Clause 25A. The device of any of clauses 22A-24A, further comprising a display configured to display decoded video data.

Clause 26A. The device of any of clauses 22A-25A, wherein the device comprises one or more of a camera, a computer, a mobile device, a broadcast receiver device, or a set-top box.

Clause 27A. The device of any of clauses 22A-26A, wherein the device comprises a video decoder.

Clause 28A. The device of any of clauses 22A-27A, wherein the device comprises a video encoder.

Clause 29A. A computer-readable storage medium having stored thereon instructions that, when executed, cause one or more processors to perform the method of any of clauses 1A-21A.

Clause 1B. A method of decoding video data, the method comprising: determining a sum of absolute values of one or more reconstructed residual sample values within a window associated with a block of the video data; determining a class index based at least in part on the sum of absolute values; determining an adaptive loop filter based on the class index; applying the adaptive loop filter to a current to-be-filtered sample of the block; and decoding the block based on the application of the adaptive loop filter.

Clause 2B. The method of clause 1B, wherein determining the sum of absolute values and determining the class index comprises applying a sum of absolute values classifier to the one or more reconstructed residual sample values within the window.

Clause 3B. The method of clause 1B or clause 2B, wherein the adaptive loop filter comprises a fixed adaptive loop filter or an adaptive loop filter signaled in a bitstream.

Clause 4B. The method of any of clauses 1B-3B, wherein the class index is restricted to be in a range of 0 to a positive integer value.

Clause 5B. The method of any of clauses 1B-4B, wherein the class index is further based on a scaling factor.

Clause 6B. The method of clause 5B, wherein the scaling factor is based on at least one of a quantization parameter, a quantization step size, a prediction mode, or a sample bit depth.

Clause 7B. The method of clause 4B or clause 5B, wherein the class index is based on the sum of the absolute values divided by the scaling factor.

Clause 8B. The method of any of clauses 1B-7B, further comprising refraining from applying a geometric transpose to the adaptive loop filter.

Clause 9B. The method of any of clauses 1B-7B, further comprising applying a geometric transpose to the adaptive loop filter.

Clause 10B. The method of any of clauses 1B-9B, further comprising parsing, from a bitstream, an identification of a classifier indicative of a sum of absolute values classifier and an indication that the reconstructed residual sample values are to be input to the classifier.

Clause 11B. The method of any of clauses 1B-10B, wherein the current to-be-filtered sample is a first current to-be-filtered sample, the window is a first window, the class index is a first class index, the adaptive loop filter is a first adaptive loop filter, and the block is a first block, the method further comprising: applying a classifier to one or more inputs associated with a second window associated with a second block of the video data to determine a second class index; applying a second adaptive loop filter to a second current to-be-filtered sample based on the second class index; and decoding the second block based on the application of the second adaptive loop filter.

Clause 12B. The method of clause 11B, wherein the one or more inputs associated with the second window comprise predictors, de-quantized transform coefficients, reconstructed residual sample values, absolute values of reconstructed residual sample values, or samples before deblocking filtering.

Clause 13B. The method of clause 11B or clause 12B, wherein the classifier comprises a Laplacian-based classifier, a band-based classifier, a sum of absolute values classifier, a sum of square values classifier, a variance classifier, an entropy classifier, or a total variation classifier.

Clause 14B. A device for decoding video data, the device comprising: one or more memories configured to store the video data; and one or more processors implemented in circuitry and communicatively coupled to the one or more memories, the one or more processors being configured to: determine a sum of absolute values of one or more reconstructed residual sample values within a window associated with a block of the video data; determine a class index based at least in part on the sum of absolute values; determine an adaptive loop filter based on the class index; apply the adaptive loop filter to a current to-be-filtered sample of the block; and decode the block based on the application of the adaptive loop filter.

Clause 15B. The device of clause 14B, wherein as part of determining the sum of absolute values and determining the class index, the one or more processors are configured to apply a sum of absolute values classifier to the one or more reconstructed residual sample values within the window.

Clause 16B. The device of clause 14B or clause 15B, wherein the adaptive loop filter comprises a fixed adaptive loop filter or an adaptive loop filter signaled in a bitstream.

Clause 17B. The device of any of clauses 14B-16B, wherein the class index is restricted to be in a range of 0 to a positive integer value.

Clause 18B. The device of any of clauses 14B-17B, wherein the class index is further based on a scaling factor.

Clause 19B. The device of clause 18B, wherein the scaling factor is based on at least one of a quantization parameter, a quantization step size, a prediction mode, or a sample bit depth.

Clause 20B. The device of clause 18B or clause 19B, wherein the class index is based on the sum of the absolute values divided by the scaling factor.

Clause 21B. The device of any of clauses 14B-20B, wherein the one or more processors are further configured to refrain from applying a geometric transpose to the adaptive loop filter.

Clause 22B. The device of any of clauses 14B-20B, wherein the one or more processors are further configured to apply a geometric transpose to the adaptive loop filter.

Clause 23B. The device of any of clauses 14B-22B, wherein the one or more processors are further configured to parse, from a bitstream, an identification of a classifier indicative of a sum of absolute values classifier and an indication that the reconstructed residual sample values are to be input to the classifier.

Clause 24B. The device of any of clauses 14B-23B, wherein the current to-be-filtered sample is a first current to-be-filtered sample, the window is a first window, the class index is a first class index, the adaptive loop filter is a first adaptive loop filter, and the block is a first block, and wherein the one or more processors are further configured to: apply a classifier to one or more inputs associated with a second window associated with a second block of the video data to determine a second class index; apply a second adaptive loop filter to a second current to-be-filtered sample based on the second class index; and decode the second block based on the application of the second adaptive loop filter.

Clause 25B. The device of clause 24B, wherein the one or more inputs associated with the second window comprise predictors, de-quantized transform coefficients, reconstructed residual sample values, absolute values of reconstructed residual sample values, or samples before deblocking filtering.

Clause 26B. The device of clause 24B or clause 15B, wherein the classifier comprises a Laplacian-based classifier, a band-based classifier, a sum of absolute values classifier, a sum of square values classifier, a variance classifier, an entropy classifier, or a total variation classifier.

Clause 27B. The device of any of clauses 14B-26B, further comprising a display configured to display decoded video data.

Clause 28B. The device of any of clauses 14B-27B, further comprising one or more of a camera, a computer, a mobile device, a broadcast receiver device, or a set.

Clause 29B. A method of encoding video data, the method comprising: determining a sum of absolute values of one or more reconstructed residual sample values within a window associated with a block of the video data; determining a class index based at least in part on the sum of absolute values; determining an adaptive loop filter based on the class index; applying the adaptive loop filter to a current to-be-filtered sample of the block; and encoding the block based on the application of the adaptive loop filter.

Clause 30B. A device for encoding video data, the device comprising: one or more memories configured to store the video data; and one or more processors implemented in circuitry and communicatively coupled to the one or more memories, the one or more processors being configured to: determine a sum of absolute values of one or more reconstructed residual sample values within a window associated with a block of the video data; determine a class index based at least in part on the sum of absolute values; determine an adaptive loop filter based on the class index; apply the adaptive loop filter to a current to-be-filtered sample of the block; and encode the block based on the application of the adaptive loop filter.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a sum of absolute values of one or more reconstructed residual sample values within a window associated with a block of the video data;
   determining a class index based at least in part on the sum of absolute values;
   determining an adaptive loop filter based on the class index;
   applying the adaptive loop filter to a current to-be-filtered sample of the block; and
   decoding the block based on the application of the adaptive loop filter, wherein determining the sum of absolute values and determining the class index comprises applying a sum of absolute values classifier to the one or more reconstructed residual sample values within the window.

2. The method of claim 1, wherein the adaptive loop filter comprises a fixed adaptive loop filter or an adaptive loop filter signaled in a bitstream.

3. The method of claim 1, wherein the class index is restricted to be in a range of 0 to a positive integer value.

4. The method of claim 1, wherein the class index is further based on a scaling factor.

5. The method of claim 4, wherein the scaling factor is based on at least one of a quantization parameter, a quantization step size, a prediction mode, or a sample bit depth.

6. The method of claim 4, wherein the class index is based on the sum of the absolute values divided by the scaling factor.

7. The method of claim 1, further comprising refraining from applying a geometric transpose to the adaptive loop filter.

8. The method of claim 1, further comprising applying a geometric transpose to the adaptive loop filter.

9. The method of claim 1, further comprising parsing, from a bitstream, an identification of a classifier indicative of a sum of absolute values classifier and an indication that the reconstructed residual sample values are to be input to the classifier.

10. The method of claim 1, wherein the current to-be-filtered sample is a first current to-be-filtered sample, the window is a first window, the class index is a first class index, the adaptive loop filter is a first adaptive loop filter, and the block is a first block, the method further comprising:
    applying a classifier to one or more inputs associated with a second window associated with a second block of the video data to determine a second class index;
    applying a second adaptive loop filter to a second current to-be-filtered sample based on the second class index; and
    decoding the second block based on the application of the second adaptive loop filter.

11. The method of claim 10, wherein the one or more inputs associated with the second window comprise predictors, de-quantized transform coefficients, reconstructed residual sample values, absolute values of reconstructed residual sample values, or samples before deblocking filtering.

12. The method of claim 10, wherein the classifier comprises a Laplacian-based classifier, a band-based classifier, a sum of absolute values classifier, a sum of square values classifier, a variance classifier, an entropy classifier, or a total variation classifier.

13. A device for decoding video data, the device comprising:
    one or more memories configured to store the video data; and
    one or more processors implemented in circuitry and communicatively coupled to the one or more memories, the one or more processors being configured to:
    determine a sum of absolute values of one or more reconstructed residual sample values within a window associated with a block of the video data;
    determine a class index based at least in part on the sum of absolute values;
    determine an adaptive loop filter based on the class index;
    apply the adaptive loop filter to a current to-be-filtered sample of the block; and decode the block based on the application of the adaptive loop filter, wherein as part of determining the sum of absolute values and determining the class index, the one or more processors are configured to apply a sum of absolute values classifier to the one or more reconstructed residual sample values within the window.

14. The device of claim 13, wherein the adaptive loop filter comprises a fixed adaptive loop filter or an adaptive loop filter signaled in a bitstream.

15. The device of claim 13, wherein the class index is restricted to be in a range of 0 to a positive integer value.

16. The device of claim 13, wherein the class index is further based on a scaling factor.

17. The device of claim 16, wherein the scaling factor is based on at least one of a quantization parameter, a quantization step size, a prediction mode, or a sample bit depth.

18. The device of claim 16, wherein the class index is based on the sum of the absolute values divided by the scaling factor.

19. The device of claim 13, wherein the one or more processors are further configured to refrain from applying a geometric transpose to the adaptive loop filter.

20. The device of claim 13, wherein the one or more processors are further configured to apply a geometric transpose to the adaptive loop filter.

21. The device of claim 13, wherein the one or more processors are further configured to parse, from a bitstream, an identification of a classifier indicative of a sum of absolute values classifier and an indication that the reconstructed residual sample values are to be input to the classifier.

22. The device of claim 13, wherein the current to-be-filtered sample is a first current to-be-filtered sample, the window is a first window, the class index is a first class index, the adaptive loop filter is a first adaptive loop filter, and the block is a first block, and wherein the one or more processors are further configured to:

apply a classifier to one or more inputs associated with a second window associated with a second block of the video data to determine a second class index;

apply a second adaptive loop filter to a second current to-be-filtered sample based on the second class index; and decode the second block based on the application of the second adaptive loop filter.

23. The device of claim 22, wherein the one or more inputs associated with the second window comprise predictors, de-quantized transform coefficients, reconstructed residual sample values, absolute values of reconstructed residual sample values, or samples before deblocking filtering.

24. The device of claim 22, wherein the classifier comprises a Laplacian-based classifier, a band-based classifier, a sum of absolute values classifier, a sum of square values classifier, a variance classifier, an entropy classifier, or a total variation classifier.

25. The device of claim 13, further comprising a display configured to display decoded video data.

26. The device of claim 13, further comprising one or more of a camera, a computer, a mobile device, a broadcast receiver device, or a set.

27. A method of encoding video data, the method comprising:

determining a sum of absolute values of one or more reconstructed residual sample values within a window associated with a block of the video data;

determining a class index based at least in part on the sum of absolute values;

determining an adaptive loop filter based on the class index;

applying the adaptive loop filter to a current to-be-filtered sample of the block; and encoding the block based on the application of the adaptive loop filter, wherein as part of determining the sum of absolute values and determining the class index, the one or more processors are configured to apply a sum of absolute values classifier to the one or more reconstructed residual sample values within the window.

28. A device for encoding video data, the device comprising:

one or more memories configured to store the video data; and one or more processors implemented in circuitry and communicatively coupled to the one or more memories, the one or more processors being configured to:

determine a sum of absolute values of one or more reconstructed residual sample values within a window associated with a block of the video data;

determine a class index based at least in part on the sum of absolute values;

determine an adaptive loop filter based on the class index;

apply the adaptive loop filter to a current to-be-filtered sample of the block; and encode the block based on the application of the adaptive loop filter, wherein as part of determining the sum of absolute values and determining the class index, the one or more processors are configured to apply a sum of absolute values classifier to the one or more reconstructed residual sample values within the window.

29. The method of claim 1, further comprising reconstructing the current-to-be-filtered sample of the block prior to applying the adaptive loop filter.

30. The device of claim 13, wherein the one or more processors is configured to reconstruct the current-to-be-filtered sample of the block prior to applying the adaptive loop filter.

* * * * *